(12) United States Patent
Muroya

(10) Patent No.: US 7,580,134 B2
(45) Date of Patent: Aug. 25, 2009

(54) METHOD OF MEASURING MICRO-STRUCTURE, MICRO-STRUCTURE MEASUREMENT APPARATUS, AND MICRO-STRUCTURE ANALYTICAL SYSTEM

(75) Inventor: Yoshiharu Muroya, Kanagawa (JP)

(73) Assignee: NEC Electronics Corporation, Kawasaki (JP)

( * ) Notice: Subject to any disclaimer, the term of this patent is extended or adjusted under 35 U.S.C. 154(b) by 0 days.

(21) Appl. No.: 12/230,322

(22) Filed: Aug. 27, 2008

(65) Prior Publication Data

US 2009/0066967 A1 Mar. 12, 2009

Related U.S. Application Data

(62) Division of application No. 11/087,673, filed on Mar. 24, 2005, now abandoned.

(30) Foreign Application Priority Data

Mar. 31, 2004 (JP) .............................. 2004-105903

(51) Int. Cl.
*G01B 9/02* (2006.01)
(52) U.S. Cl. ........................ 356/511; 356/504
(58) Field of Classification Search ................. 356/512, 356/513, 516, 504, 497
See application file for complete search history.

(56) References Cited

U.S. PATENT DOCUMENTS

| | | | |
|---|---|---|---|
| 4,748,329 A | 5/1988 | Cielo et al. | |
| 5,889,592 A * | 3/1999 | Zawaideh | 356/504 |
| 6,639,682 B2 | 10/2003 | Neily et al. | |
| 7,019,844 B2 | 3/2006 | Venugopal et al. | |
| 2008/0215271 A1* | 9/2008 | Bankhead et al. | 702/71 |

FOREIGN PATENT DOCUMENTS

| | | |
|---|---|---|
| EP | 0 350 869 | 1/1990 |
| EP | 0 727 715 | 8/1996 |
| JP | 11-211421 | 8/1999 |
| JP | 2001-217291 | 8/2001 |

OTHER PUBLICATIONS

European Search Report dated Jul. 22, 2008.

* cited by examiner

*Primary Examiner*—Hwa S Lee (Andrew)
(74) *Attorney, Agent, or Firm*—McGinn IP Law PLLC

(57) ABSTRACT

This invention provides a method and an apparatus of measuring a micro-structure, capable of evaluating a geometry of a micro-structure formed typically on the surface of a semiconductor substrate, in a non-destructive, easy, precise and quantitative manner. A reflection spectrum of a sample having a known dimension of a target micro-geometry is measured (A1), features (waveform parameters) which strongly correlate to a dimension of the measured micro-geometry are determined (A2), a relation between the dimension of the micro-geometry and the waveform parameters is found (A3), and a dimension of the micro-structure having an unknown dimension is finally determined using this relation and based on the reflection spectrum obtained therefrom (A4, A5).

6 Claims, 17 Drawing Sheets

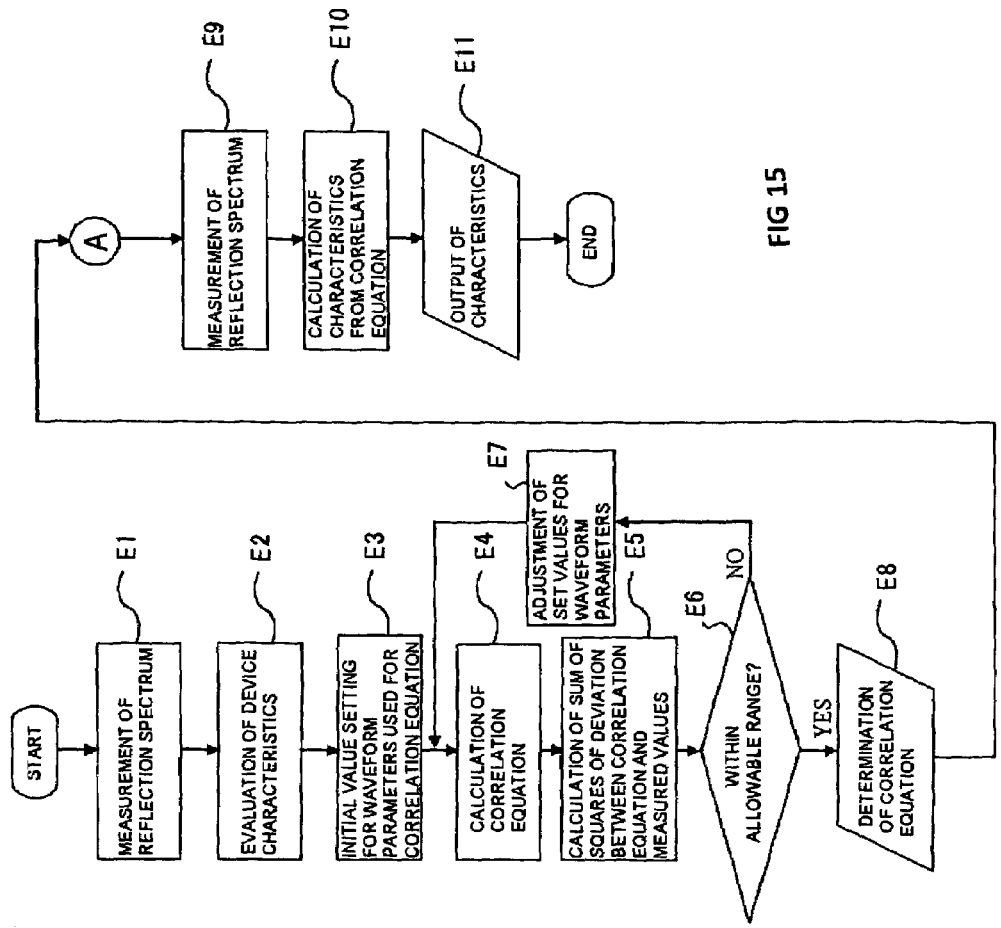
FIG 15
FIG. 16
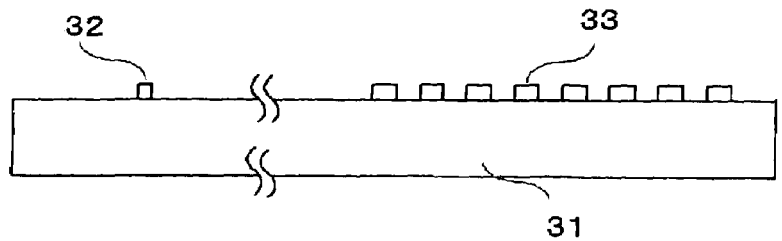

METHOD OF MEASURING MICRO-STRUCTURE, MICRO-STRUCTURE MEASUREMENT APPARATUS, AND MICRO-STRUCTURE ANALYTICAL SYSTEM

The present application is a Divisional Application of U.S. patent application Ser. No. 11/087,673 filed on Mar. 24, 2005 now abandoned.

This application is based on Japanese patent application No. 2004-105903 the content of which is incorporated hereinto by reference.

DISCLOSURE OF THE INVENTION

1. Field of the Invention

The present invention relates to a method of measuring a micro-structure, a micro-structure measurement apparatus, and a micro-structure analytical system, and in particular to a method of measuring a micro-structure, a micro-structure measurement apparatus, and a micro-structure analytical system preferably applicable to optical measurement of structures of nanometer level.

2. Related Art

It has conventionally been important in semiconductor fabrication processes such as lithography, etching and so forth, aimed at forming fine patterns of a 0.1 μm (micrometer) level, to precisely control dimensions of the patterns at the nanometer level, so that it has been believed as essential to readily and precisely measure dimensions of the patterns, when conditions for the light exposure or etching are confirmed, or during process control for mass production.

With respect to gratings formed in a distribution-feedback-type (DFB) semiconductor laser element used for optical communication, those having a periodicity of approximately 0.2 μm or 0.24 μm corresponding to a laser oscillation wavelength of a 1.3-μm band or 1.55-μm band is formed by the electron beam exposure process or interference exposure process. It is necessary for geometric parameters of the grating formed herein in the laser element, which include height, duty ratio and periodicity, to be controlled with a precision of several nanometers level, and these may be factors heavily affective to oscillation characteristics of the laser. Insufficient precision in the control of the lithographic process or etching process may fail in obtaining a stable single-mode oscillation, fail in obtaining oscillation threshold value or optical output satisfactory in view of product standards, or result in a lowered yield ratio. It is therefore essential to provide a process control step or a feedback step, based on evaluation of the fabricated grating pattern.

This sort of pattern, having a dimension to be measured as fine as 0.1 μm or around, cannot be evaluated under an optical microscope or laser microscope with a satisfactory resolution. It is therefore a general technique to measure dimension of the pattern under a scanning electron microscope (SEM).

Measurement under a scanning electron-microscope, however, raises a problem in that observation of the sectional shape inevitably needs cutting of the sample, so that the measurement will never be applicable to the samples which cannot be subjected to destructive inspection. On the other hand, non-destructive observation of the surface state under a CD-SEM raises difficulty in measurement of correct shape, because depth-wise information cannot be obtained. Another problem of the measurement under the electron microscope resides in that it takes a long time due to need of setting of the sample in vacuo, so that the measurement is not fully applicable to the mass production process.

As exemplary methods of optical measurement of a fine periodical pattern, Japanese Laid-Open Patent Publication No. 1999-211421 and No. 2001-217291 disclose techniques in which a polarized light is irradiated onto the fine periodic pattern, and the reflected light is measured. The techniques make use of a nature of polarization-direction-dependent birefringence of the periodic structure, and is successful to a certain degree in view of realizing non-destructive measurement of line width of the periodic structure.

Japanese Laid-Open Patent Publication No. 2001-217291 discloses a method of geometrically evaluating a substrate having an irregular-finished surface, based on spectral elipsometry. The technique is aimed at measuring a surface profile of a substrate having irregularity formed on the surface thereof in order to increase capacitance of capacitors in DRAM (dynamic random access memory). The technique is successful to a certain degree, so far as the irregular layer is assumed as a virtual flat film in a macroscopic view, the thickness and refractive index of the virtual flat film are then determined based on analyses of the reflection spectrum, and ratio of semiconductor (volume fraction) in the virtual film composed of the semiconductor and air is measured based on these values.

The methods of measuring line width of a periodic structure described in Japanese Laid-Open Patent Publication No. 11-211421 and ditto No. 2001-217291, however, raise a problem in that only a limited amount of reflection characteristic data is measurable, and in that information on the height cannot be obtained, because the line width of the periodic structure is an only measurable parameter, without considering any influences of multiple reflection, or reflection in directions other than that normal to the incident light. Another problem resides in that there is no clear explanation on the method applied to measurement of other geometries such as typically having a slope or the like, so that the method is not readily applicable.

There is also a description on preparation of a calibration curve through measurement of known samples. The method is, however, only applicable to the measurement of line width of the periodic structure, and cannot readily be applied to the measurement of height, for example, of the periodic structure.

On the other hand, the method of measuring surface profile of an irregular substrate based on the spectral ellipsometry described in Japanese Laid-Open Patent Publication No. 2001-217291 pays no regard to reflection on surfaces other than those in parallel with the sample to be measured, and consequently pays no regard to influences of scattered light which depends on geometry of the target object to be measured, and this results in only a limited accuracy in the measurement.

More specifically, measured results shown in FIG. 13 of Japanese Laid-Open Patent Publication No. 2001-217291 are found to differ by a maximum of approximately 30% or more from results of the SEM observation, and this raises a problem of insufficient accuracy in the measurement.

What is worse, no information is available on density of the irregular geometry (corresponded to periodicity of the periodic structure pattern), which is a target object to be measured, and any changes in the density may further worsen the accuracy of the measurement.

SUMMARY OF THE INVENTION

The invention disclosed in the present invention, aiming at solving the above-described subjects, is typically and schematically configured as follows.

According to one aspect of the present invention, there is provided a micro-structure measurement apparatus measuring a geometry of a micro-structure, of which surface is irradiated by a measuring beam, based on wavelength dependence of intensity of the reflected light or on wavelength dependence of intensity of the transmitted light through the micro-structure, comprising:

(a1) a unit measuring the wavelength dependence of intensity of the reflected light or the transmitted light with respect to at least one sample having a target micro-geometry of a known dimension formed thereon;

(a2) a unit determining features of the wavelength dependence of intensity of the reflected light or the transmitted light, which are in a strong correlation with the dimensions of the target micro-geometry;

(a3) a unit finding relations between the dimensions of the target micro-geometry, and the features of the wavelength dependence of intensity of the reflected light or the transmitted light; and (a4) a unit finding dimension of the micro-structure, of which surface is irradiated by a measuring beam, using the relations between the dimensions of the target micro-geometry, and the features of the wavelength dependence of intensity of the reflected light or the transmitted light, based on the wavelength dependence of intensity of the reflected light or the transmitted light.

The micro-structure measurement apparatus according to the present invention may further comprise a calculation unit calculating the geometry of the micro-structure, considering reflection on the surfaces other than those in parallel with the measurement surface of the micro-structure, or interference ascribable to the reflection.

The micro-structure measurement apparatus according to the present invention may further comprise a calculation unit calculating the geometry of the micro-structure, considering reflection on the surfaces other than those normal to the measurement surface of the micro-structure, or interference ascribable to the reflection, obtained when the measuring beam is irradiated normal to a sample surface.

The micro-structure measurement apparatus according to the present invention may further comprise a unit measuring at least one of the sample having a target micro-geometry of a known dimension in order to cope with at least one unknown material characteristic, or with at least one geometry-dependent unknown reflection characteristic; and a calculation unit calculating the unknown material characteristic or the geometry-dependent reflection characteristic.

According to another aspect of the present invention, there is provided a micro-structure measurement apparatus which comprises:

(b1) a unit measuring a reflection spectrum which expresses a wavelength dependence of intensity of the reflected light from a periodic structure irradiated by the measuring beam;

(b2) a unit obtaining a calculative values of the reflection spectrum assuming height, duty ratio and periodicity of the periodic structure, and calculating a sum of squares of deviation between the measured values of the reflection spectrum and the calculated values of the reflection spectrum;

(b3) a unit varying the height, duty ratio and periodicity of the periodic structure so as to minimize thus-calculated sum of squares of the deviation; and (b4) a unit characterizing a geometry of the periodic structure with the height, duty ratio and periodicity which minimize the sum of squares of the deviation.

According to still another aspect of the present invention, there is provided a micro-structure measurement apparatus measuring a geometry of a micro-structure, of which surface is irradiated by a measuring beam, based on wavelength dependence of intensity of the reflected light from the micro-structure, comprising:

(c1) a unit measuring a wavelength dependence of intensity of the reflected light from a plurality of micro-structures each having a target portion of a known dimension; and (c2) a unit finding, by a statistical analysis, a correlation between dimensions of the target portions of the micro-structures, and at least one of the waveform parameters unambiguously determined based on the wavelength dependence of intensity of the reflected light.

According to still another aspect of the present invention, there is provided a micro-structure measurement apparatus measuring a geometry of a micro-structure, of which surface is irradiated by a measuring beam, based on wavelength dependence of intensity of the reflected light from the micro-structure, comprising:

(d1) a unit measuring a wavelength dependence of intensity of the reflected light from a plurality of micro-structures each having known physical characteristics of device dependent to dimension of target portions to be measured; and (d2) a unit finding, by a statistical analysis, a correlation between physical characteristics of device dependent to dimension of the target portions to be measured, and at least one of the waveform parameters unambiguously determined based on the wavelength dependence of intensity of the reflected light.

The micro-structure measurement apparatus according to the present invention may be configured so as to determine at least one waveform parameter unambiguously determined based on the wavelength dependence of intensity of the reflected light, using the calculation unit.

The micro-structure measurement apparatus according to the present invention may further comprise:

a unit defining a correlation equation which expresses correlation of dimension of target portions to be measured, or physical properties of device dependent to the dimension, with the waveform parameters, as a summation of the individual waveform parameters multiplied by respective coefficients; and a unit calculating a sum of squares of deviation of the dimension or physical properties obtained from the correlation equation, with respect to the measured dimension or physical properties, and determining the respective coefficients of the individual parameters so as to minimize thus-calculated sum of squares of deviation.

According to still another aspect of the present invention, there is provided a micro-structure measurement apparatus irradiating the surface of a sample with a measuring beam, and measuring a geometry of a micro-structure having no periodic structure nor structure equivalent to the periodic structure having a dimension shorter than the wavelength of the measuring beam, based on wavelength dependence of intensity of the reflected light from the sample, which comprises:

(e1) a unit producing an isolated micro-structure and a periodic structure at the same time on the sample, the isolated micro-structure being defined as the micro-structure having no periodic structure nor structure equivalent to the periodic structure;

(e2) a unit preliminarily determining a geometric relation between the isolated micro-structure and the periodic structure; and (e3) a unit measuring a dimension of the isolated micro-structure by optically measuring the periodic structure.

According to the present invention, there is also provided a computer program product for the micro-structure measurement apparatus of the present invention, implementing the individual processes of the micro-structure measurement apparatus.

According to the present invention, there is still also provided a method of measuring a micro-structure, of which surface is irradiated by a measuring beam, based on wavelength dependence of intensity of the reflected light, aimed at realizing the process procedure of the above-described micro-structure measurement apparatus of the present invention.

According to the present invention, there is still also provided a micro-structure analytical system configured as a data analytical system in which a reflection spectrum analysis center terminal installed at a reflection spectrum analysis center and a production factory terminal installed at a production factory equipped with a reflection spectrum measurement apparatus are connected through a communication line with each other, wherein the reflection spectrum analysis center terminal further comprises:

a unit receiving an order information which includes, as information on an analytical sample requested from the production factory, reflection spectrum information on a plurality of the analytical samples, and dimensional information on the target portions to be measured of each of the plurality of samples, and storing the order information in a storage unit;

an analytical unit finding a correlation equation expressing the dimensions of the portions to be measured and waveform parameters of the reflection spectrum; and a unit sending the analytical result to the terminal at the production factory.

The micro-structure analytical system of the present invention is characterized in using the above-described method of measuring a micro-structure as the unit finding a correlation equation in the data analytical system.

According to the present invention, it is made possible to readily and accurately measure geometry of micro-structures in a non-destructive manner, which must have been observed under a SEM in a destructive manner in the prior art. The present invention applied to a periodic structure makes it possible to precisely measure height, duty ratio and periodicity of the periodic structure in a non-destructive manner.

According to the present invention, it is also made possible to provide a generally-adoptable, simple and high-precision method of measurement, adoptable to production processes in which dimension of micro-structures to be fabricated is predictable to a certain degree, and in which dimensional control to as precise as sub-micrometer or nanometer level is necessary.

It is therefore made possible to provide a general-purpose method and an apparatus of measuring a micro-structure, and a micro-structure analytical system, capable of readily, precisely and quantitatively evaluating geometry of the micro-structure formed typically on the surface of semiconductor, through measurement of wavelength dependence of intensity of the reflected light (reflection spectrum) obtained when a measurement sample is irradiated by a measuring beam.

It is also made possible to provide a general-purpose method and an apparatus of measuring a micro-structure, and a computer program and a system, preferably applicable to process control or the like in the mass production, and capable of realizing a simple and precise measurement.

BRIEF DESCRIPTION OF THE DRAWINGS

The above and other objects, advantages and features of the present invention will be more apparent from the following description taken in conjunction with the accompanying drawings, in which:

FIG. 15 is a flow chart explaining calculation procedures according to an embodiment of the method of measuring a micro-structure of the present invention;

FIG. 16 is a drawing explaining a method of predicting geometric evaluation of an isolated pattern from geometric evaluation results of a grating pattern in an embodiment of the present invention;

DETAILED DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposes.

Next paragraphs will describe embodiments of the present invention in order to further detail the present invention, referring to the attached drawings.

Figure 1:
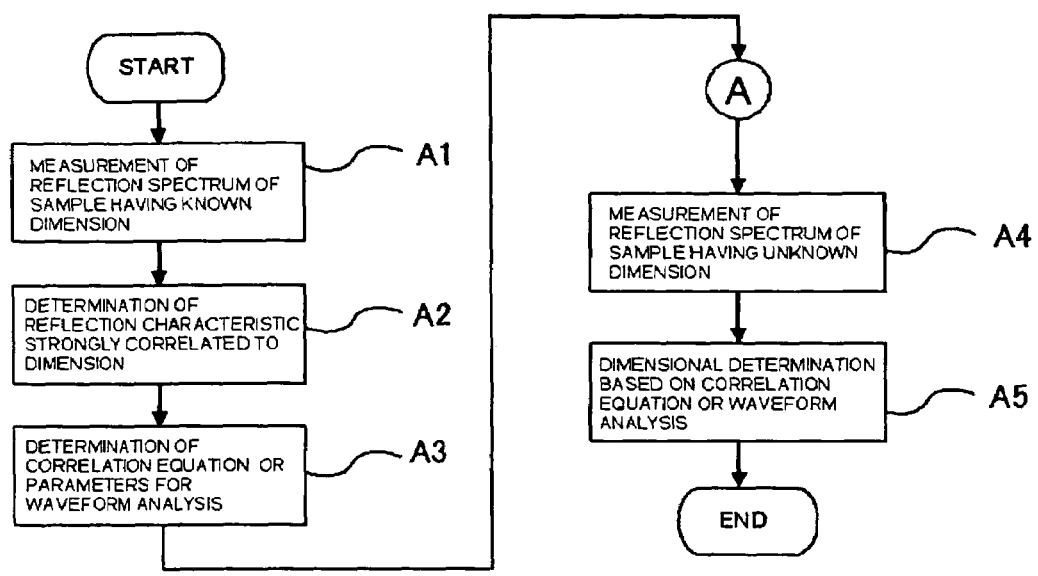
FIG. 1 is a flow chart explaining procedures of a micro-structure analysis of the present invention.
Figure 2A:
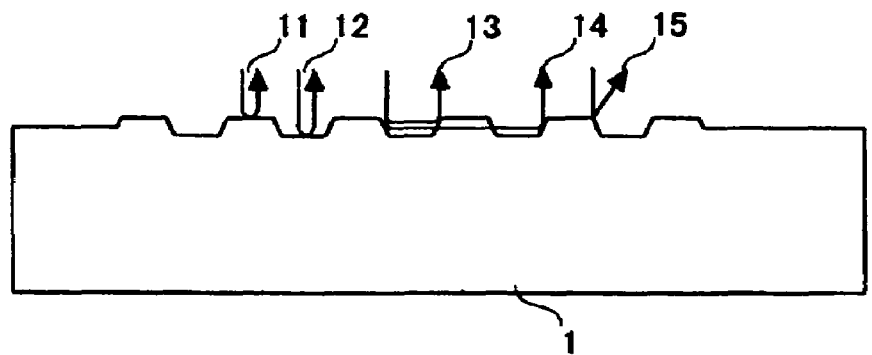
FIG. 2A is a sectional view showing a geometry of a micro-structure and reflection characteristics of a measuring beam observed in a sample measurement according to an embodiment of the method of measuring a micro-structure of the present invention.
Figure 2B:
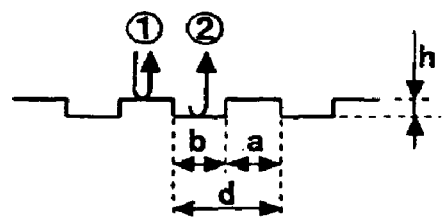
FIGS. 2B and 2C are drawings showing a principle of the method of measuring a micro-structure of the present invention.
Figure 2C:
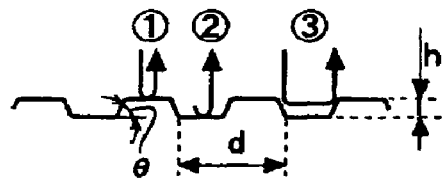
Figure 3:
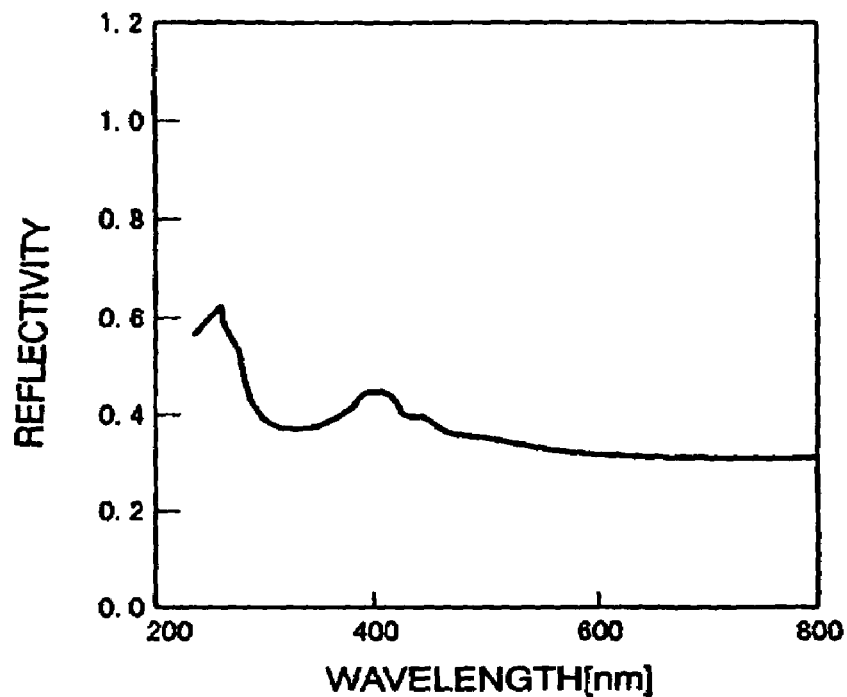
FIG. 3 is a reflection spectral chart of an InP substrate for explaining the principle of the method of measuring a micro-structure of the present invention.
Figure 4:
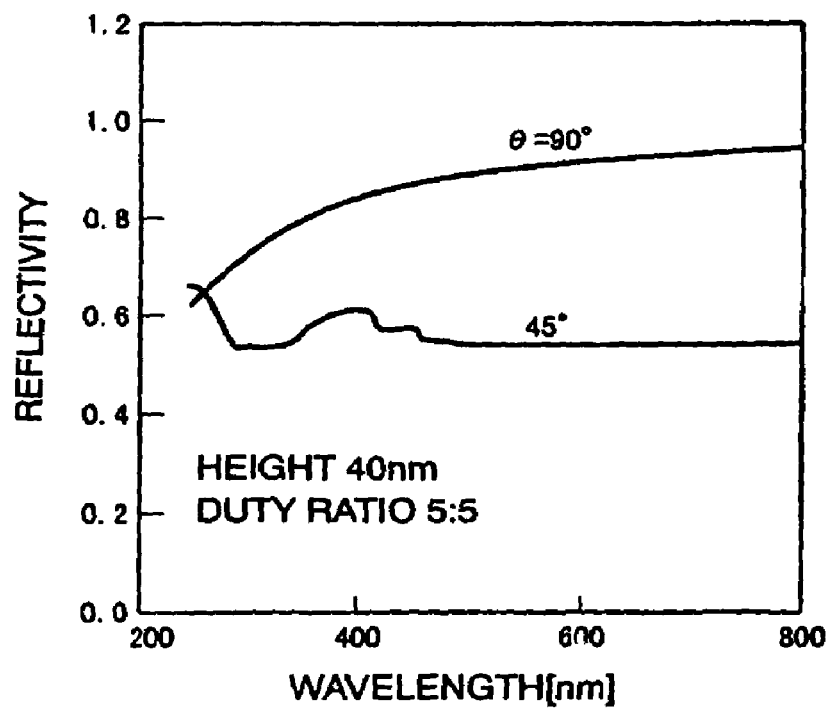
FIG. 4 is a chart showing exemplary calculations of reflection spectra for explaining the principle of the method of measuring a micro-structure of the present invention.
Figure 5:
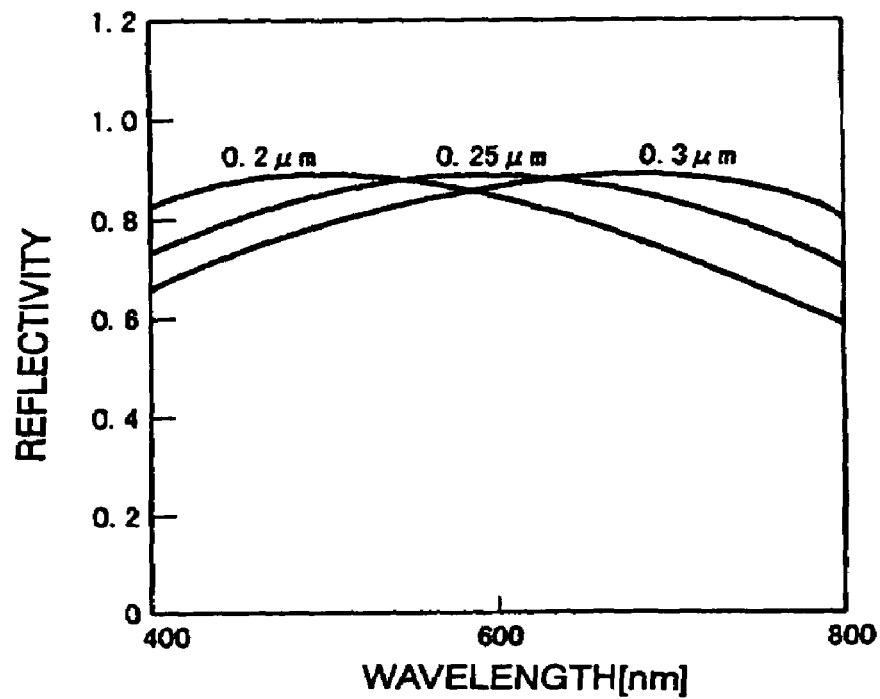
FIG. 5 is a chart showing exemplary calculations of reflection spectra for explaining the principle of the method of measuring a micro-structure of the present invention.

FIG. 1 is a drawing explaining an embodiment for carrying out the present invention. FIG. 1 shows one embodiment of a procedure of analyzing a micro-structure according to the present invention. FIGS. 2A to 2C are sectional views showing a geometry of a micro-structure and reflection characteristics of a measuring beam observed in a sample measurement according to an embodiment of the method of measuring a micro-structure of the present invention. FIGS. 3 to 5 are charts further detailing the principle of the method of measuring a micro-structure according to one embodiment of the present invention.

Process procedures of one embodiment of the micro-structure analysis of the present invention will be explained referring to FIG. 1. In the technique of evaluating a micro-geometry according to the present invention, the surface of at least one sample having a micro-geometry of a known dimension is irradiated with a measuring beam, and a reflection spectrum of the reflected light is measured (step A1).

Next, with respect to such sample of known dimension, features of the spectrum of the reflected light (waveform parameters such as peak intensity, wavelength, etc.) which strongly correlate with dimension of measured micro-geometry are determined (step A2).

The system is then modeled by determining a relation between the dimension of the micro-geometry and the waveform parameters (correlation equation, or parameters for waveform analysis) (step A3). The dimension of the micro-geometry to be modeled is specified as dimension characterizing a geometry of the sample, or as dimensional parameters calculated from the dimension. The dimensional parameters include, as typically shown in FIG. 2B and FIG. 2C, periodicity (d), height (h), width of the top portion of the step (a), width of the bottom portion of the step (b), duty ratio (a/b), and angle of the step portion ($\theta$).

Next, the measuring beam is irradiated onto the surface of the micro-structure having an unknown dimension, and the reflection spectrum is measured (step A4).

Matching with the modeled system is then carried out using the relation, obtained in step A3, between the dimension of the micro-geometry and the waveform parameters (correlation equation, or parameters for waveform analysis), and the dimension of the micro-structure having an unknown dimension is then determined based on the dimensional parameters specified by the matched system (step A5).

The next sample can be measured by repeating steps A4 and A5, succeeding to "A". It is to be noted that the process procedures shown in FIG. 1 can be implemented by a computer program which is run on a computer composing the measurement apparatus.

A target sample to be measured in this embodiment is a mesa-formed grating formed on the surface of a semiconductor substrate, by etching through a resist mask. FIG. 2A shows a state of the reflected light, obtained when the measurement sample 1 is irradiated by the measuring beam such as a halogen lamp.

In this embodiment, the following factors will be taken into account as the reflected light when the measuring beam is irradiated. More specifically, by incorporating the following types of reflected light as optical path models used for calculating reflection intensity (spectrum) expected from a hypothetical geometry, intensities of several types of hypothetical optical path are calculated, and the results are supposed to thereby estimate a total intensity. That is, reflected light 11 on the top of the mesa;
reflected light 12 on the bottom of the mesa;
multiple reflected light 13 on the slope of the mesa; and
multiple reflected light 14 once reflected on the slope of the mesa, transmitted through a part of the substrate, and further reflected on the slope of other mesa are considered, and influences of interference ascribable to difference in the length of optical paths of the individual reflected lights are taken into consideration.

A scattered light 15, which is not measured as the reflected light, is also taken into consideration.

In the measurement of the reflection spectrum of the rectangular grating structure formed typically on the semiconductor substrate as shown in FIG. 2B, the reflection intensity will vary due to retardation between the reflected light (reference numeral 1) on the top of the grating and the reflected light (reference numeral 2) on the bottom, if the periodicity d of the grating is smaller enough than the measurement wavelength. More specifically, by virtue of the difference in the length of optical path ($2h$) between the lights reflected on the top and bottom, the reflectivity becomes maximum at a wavelength where both reflected lights have the same phase, but is reduced at a wavelength where the phase of the both is inverted, depending on the duty ratio (a:b).

On the other hand, in the measurement of the mesa-formed grating as shown in FIG. 2C, it is all enough to consider interference of the multiple reflected light (reference numeral 3) on the slope, in addition to the reflected light (reference numeral 1) on the top of the grating and the reflected light (reference numeral 2) on the bottom similarly to as shown in FIG. 2B.

The reflection spectrum can be determined by further taking influences of the reflected light 14 and scattered light 15 shown in FIG. 2A into consideration.

As one method of evaluating influences of the multiple reflection by the grating, there is known a method of making use of wavelength dependence of reflectivity of the substrate.

FIG. 3 shows a wavelength dependence of absolute reflectivity of an InP substrate. The reflectivity becomes maximum at around 250 nm and 400 nm, and grows still larger in these wavelength regions than in other regions with increase in the multiple reflection component. Based on the maximum values of the reflection spectrum, it is made possible to estimate the amount of multiple reflection dependent to ratio and angle of the slope.

FIG. 4 shows exemplary calculations of the reflection spectra of the gratings corresponded to those shown in FIG. 2B and FIG. 2C respectively formed on an InP substrate. In FIG. 4, the abscissa plots the wavelength, and the ordinate plots the reflectivity with respect to the InP substrate. Each grating was 40 nm in height, and 5:5 (1:1) in the duty ratio.

The rectangular grating ($\theta=90°$) having no slope shows a larger decrease in the reflectivity in a shorter measurement wavelength, due to interference of the reflected lights from the top and bottom.

On the other hand, the structure having the slope ($\theta=45°$) shows a reflection spectrum having a maximum value at around 400 nm due to the multiple reflection.

As another method of evaluating influences of the multiple reflection by the grating, there is also known a method of making use of wavelength dependence of the reflected light 14 shown in FIG. 2A.

FIG. 5 shows reflection spectra of the gratings formed on an InP substrate, having the periodicity varied from 0.2 μm to 0.3 μm, while keeping the duty ratio unchanged. It is found that the reflection spectra show the maximum values shifted towards the longer wavelength region as the periodicity increases, due to influences of the interference of the multiple reflection lights caused by difference in the lengths of optical path. The maximum value depends also on the duty ratio, and shifts towards the longer wavelength region, as the ratio of area having a larger refractive index increases, if the periodicity is kept unchanged.

Example 1

Next paragraphs will detail embodiments of the measurement apparatus and calculation procedures based on the principle of the micro-structure measurement of the present invention, referring to the attached drawings.

Figure 6:
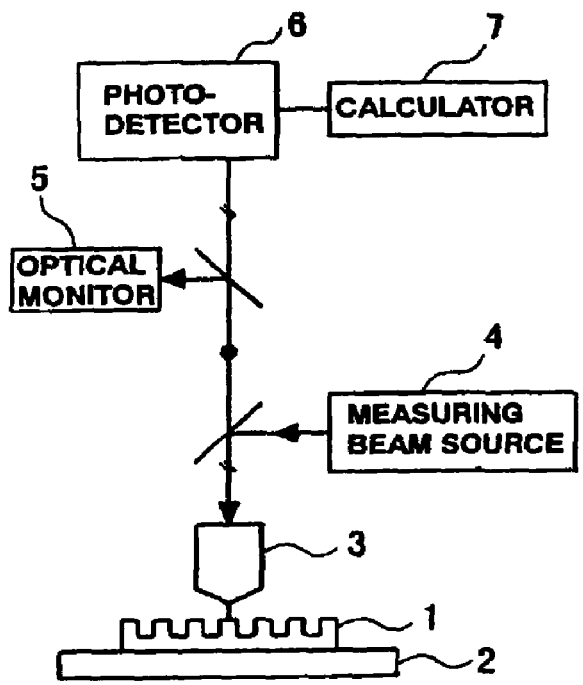
FIG. 6 is a block diagram showing a configuration of Example 1 of the micro-structure measurement apparatus according to the present invention.
Figure 7:
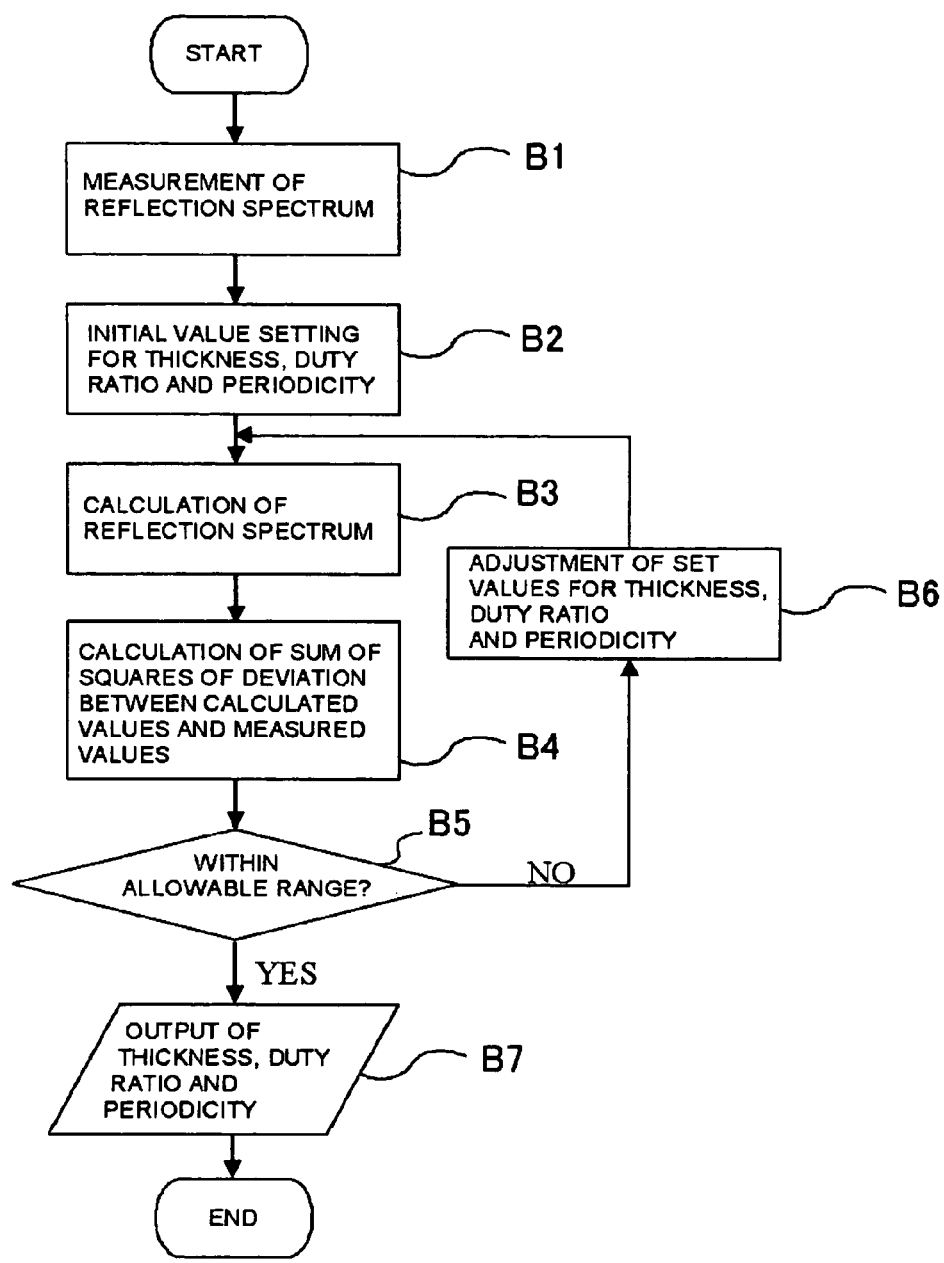
FIG. 7 is a flow chart explaining calculation procedures in Example 1 of the method of measuring a micro-structure of the present invention.
Figure 8:
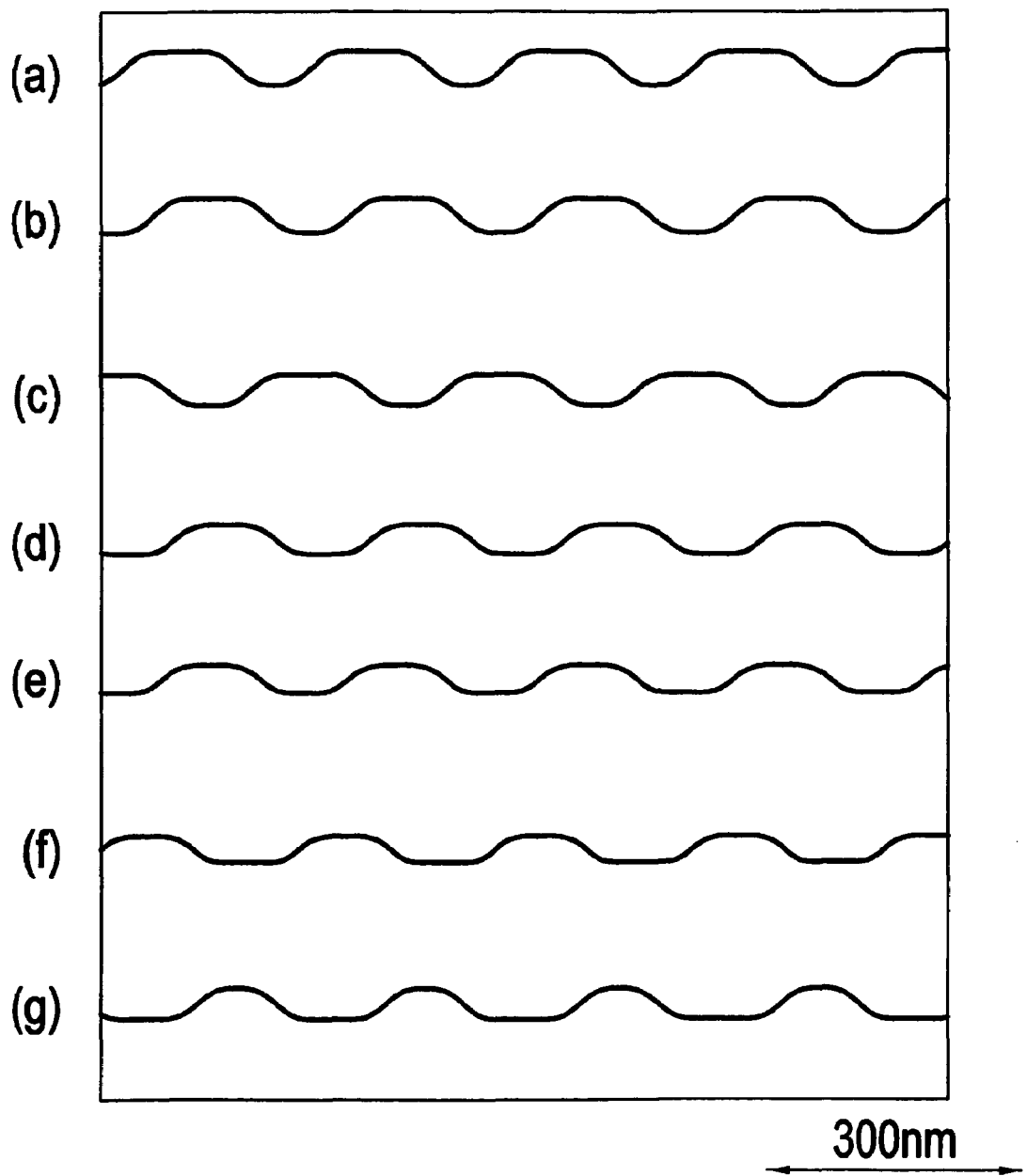
FIGS. 8A to 8G are electron microphotographs showing sectional geometries of gratings measured in Examples of the present invention.

FIG. 6 shows a block diagram showing a configuration of one embodiment of the periodic structure measurement apparatus of the present invention. FIG. 7 is a flow chart explaining calculation procedures in Example of the method of measuring a micro-structure of the present invention. Referring now to FIG. 6, this Example is configured as having a sample stage 2 on which the measurement sample 1 is placed, a measuring beam source 4, such as a halogen lamp, supplying the measuring beam, a photo-detector 6 allowing the measuring beam to normally irradiate the sample and spectrally measuring the reflected light from the sample, and a calculator 7 processing data obtained by the photo-detector 6.

Figure 21:
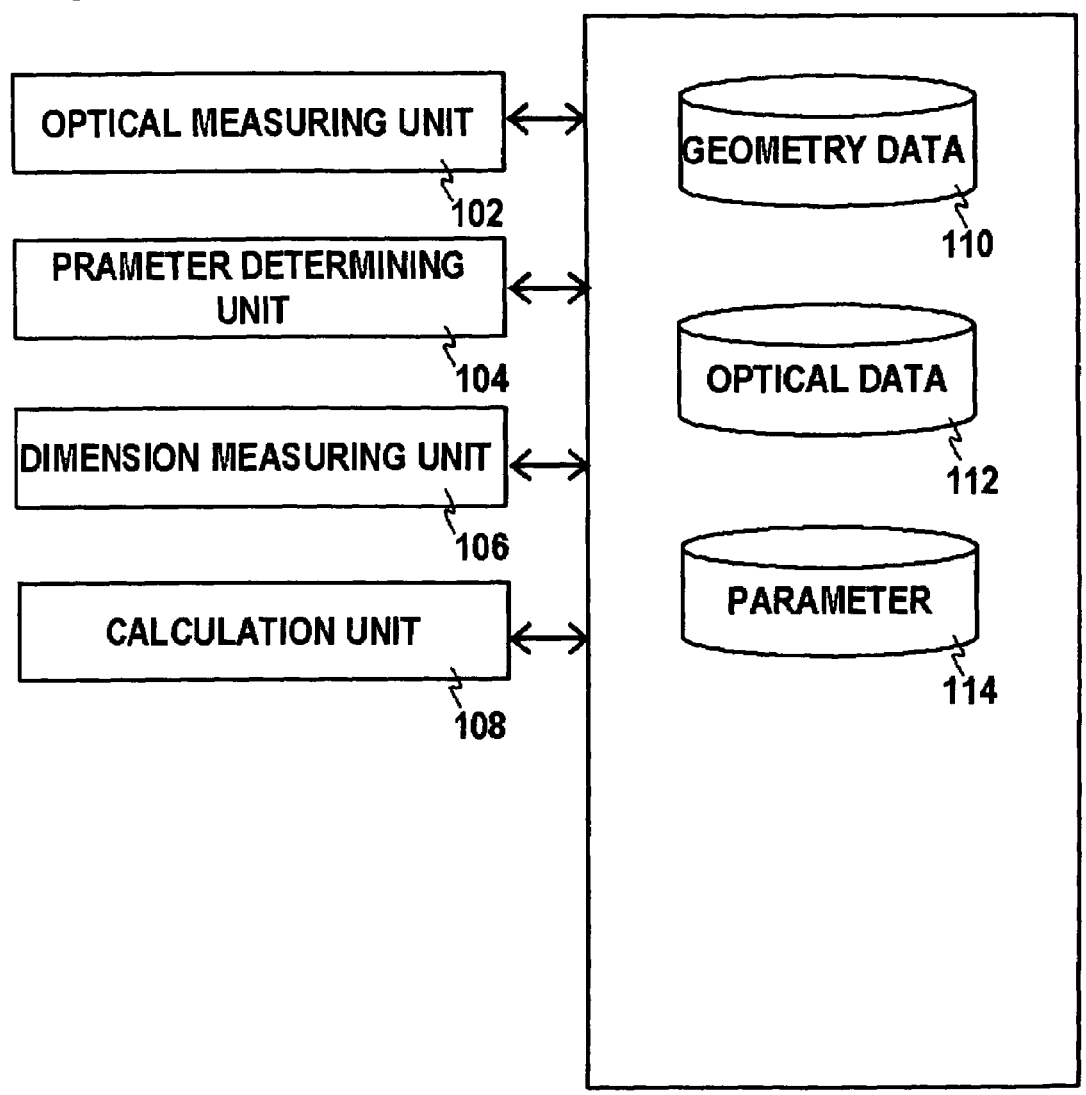
FIG. 21 is a block diagram showing a configuration of one embodiment of the micro-structure measurement apparatus of the present invention.

The periodic structure is measured by measuring wavelength dependence of intensity of the reflected light from the sample using the photo-detector 6, and by analyzing thus-measured wavelength dependence of intensity of the reflected light using the calculator 7. For a small-sized target region for the measurement, an objective lens 3 and an optical monitor 5 observing the target region to be measured are provided. This makes it possible to measure the region as small as 1 μm in diameter or around. FIG. 21 shows a block diagram showing a configuration of one embodiment of the micro-structure measurement apparatus of the present invention. The apparatus is used for measuring a geometry of a micro-structure, of which surface is irradiated by a measuring beam, based on wavelength dependence of intensity of the reflected light or on wavelength dependence of intensity of the transmitted light through said micro-structure.

The apparatus comprises:

a unit measuring said wavelength dependence of intensity of the reflected light or the transmitted light with respect to at least one sample having a target micro-geometry of a known dimension formed thereon (optical measuring unit 102);

a unit determining features (referred to as "waveform parameters") of said wavelength dependence of intensity of the reflected light or the transmitted light, which are in a predetermined correlation with the dimensions of said target micro-geometry (parameter determining unit 104);

a unit finding relations between the dimensions of said target micro-geometry and said waveform parameters (dimension measuring unit 106);

a unit finding dimension of said micro-structure (dimension measuring unit 106), of which surface is irradiated by a measuring beam, using said relations between the dimensions of said target micro-geometry and said waveform parameters, based on said wavelength dependence of intensity of the reflected light or the transmitted light; and a calculation unit calculating the geometry of the micro-structure (calculation unit 108), considering reflection on the surfaces other than those in parallel with the measurement surface of said micro-structure, or interference ascribable to said reflection.

The calculation unit can calculate the geometry of the micro-structure, considering reflection on the surfaces other than those normal to the measurement surface of said micro-structure, or interference ascribable to said reflection, obtained when the measuring beam is irradiated normal to a sample surface.

The apparatus can comprise a unit measuring at least one of said sample having a target micro-geometry of a known dimension in order to cope with at least one unknown material characteristic, or with at least one geometry-dependent unknown reflection characteristic; and the calculation unit calculating said unknown material characteristic or said geometry-dependent reflection characteristic.

Figure 22:
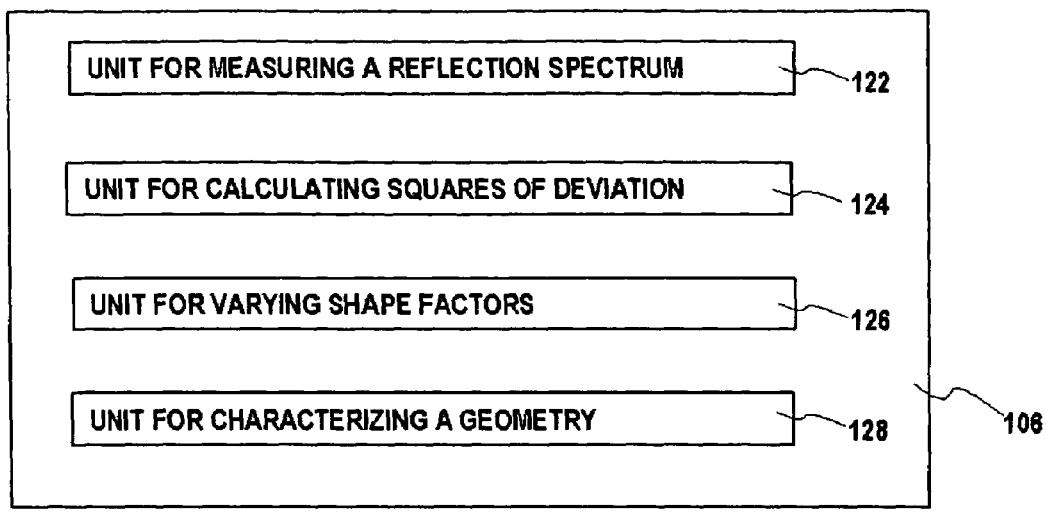
FIG. 22 is a block diagram showing a configuration of one embodiment of the dimension measuring.

FIG. 22 shows a block diagram showing a configuration of one embodiment of the dimension measuring unit 106. The unit 106 comprises;

a unit for measuring a reflection spectrum 122 measuring a reflection spectrum which expresses a wavelength dependence of intensity of the reflected light from a periodic structure irradiated by the measuring beam;

a unit for calculating squares of deviation 124, obtaining a calculative values of the reflection spectrum assuming height, duty ratio and periodicity of said periodic structure, and calculating a sum of squares of deviation between the measured values of said reflection spectrum and the calculated values of said reflection spectrum;

a unit for varying shape factors 126, varying the height, duty ratio and periodicity of said periodic structure so as to minimize thus-calculated sum of squares of said deviation; and a unit for characterizing a geometry 128, characterizing a geometry of said periodic structure with the height, duty ratio and periodicity which minimize the sum of squares of said deviation.

Further, the micro-structure measurement apparatus can comprise a unit measuring a wavelength dependence of intensity of the reflected light from a plurality of micro-structures each having a target portion of a known dimension and a unit finding, by a predetermined statistical analysis, a correlation between dimensions of the target portions of said micro-structures, and at least one of said waveform parameters.

The micro-structure measurement apparatus can comprise:

a measuring unit irradiating the measuring beam to a sample having an unknown dimension, and measuring a reflection spectrum; and a dimension finding unit finding the dimension of said sample having an unknown dimension, using said relation between the dimension of said geometry and the features of said reflection spectrum obtained by said unit determining the waveform parameters, based on said reflection spectrum measured by said measuring unit.

The micro-structure measurement apparatus can comprise:

a first unit irradiating a measuring beam to a sample, and measuring a reflection spectrum;

a second unit initializing set values of dimensional parameters of a geometry of said sample;

a third unit calculating a reflection spectrum based on said set values;

a fourth unit finding a sum of squares of deviation between calculated values of said reflection spectrum and measured values of said reflection spectrum;

a fifth unit judging whether said sum of squares of deviation falls within a predetermined allowable range or not;

a sixth unit varying the set values of the dimensional parameters of the geometry of said sample, if said sum of squares of deviation is judged by said fifth unit as falling outside said predetermined allowable range, to thereby control said third unit so as to calculate the reflection spectrum, and control said fourth unit and said fifth unit so as to implement the functions thereof; and a seventh unit outputting said dimensional parameters of said sample used for calculating said reflection spectrum, if said sum of squares of deviation is judged by said fifth unit as falling within said predetermined allowable range.

The analytical procedures of the micro-structure in this Example will be explained referring to the flow chart shown in FIG. 7. In the method of analyzing the obtained wavelength dependence of intensity of the reflected light, the measurement sample 1 having the micro-structure is set on the sample stage 2, the sample is irradiated by the measuring beam 4 emitted from the measuring beam source 4, the reflection spectrum is measured using the photo-detector 6 (step B1), and the measured reflection spectrum (measured value) is stored.

The calculator 7 then sets arbitrary initial values for the height, duty ratio and periodicity, which are dimensional parameters of the periodic structure to be measured (step B2), and calculates the reflection spectrum based on the initial set values of the height, duty ratio and periodicity of the periodic structure (step B3). More specifically, when the semiconductor substrate having the periodic micro-structure formed thereon is irradiated with the measuring beam of an arbitrary wavelength, the light observed as the reflected light is given as a result of interference of the individual reflected lights on the top, bottom and slope of the grating, caused by retardation dependent to difference in the length of optical path, so that it is possible to accurately determine the reflectivity of the semiconductor substrate having the periodic micro-structure formed thereon, through calculation taking reflection dependent to the individual refractive indices of the semiconductor and air, and lowering in the reflectivity due to the scattered light dependent to geometry of the pattern into consideration. The reflection spectrum can be calculated by carrying out the similar calculation also for the case where the wavelength of the incident light is varied.

The calculator 7 then compares calculated values of the reflection spectrum obtained in step B3 and the measured values of the reflection spectrum obtained in step B1, and then calculates a sum of squares of deviation between the measured values and calculated values of the reflection spectrum (step B4).

The calculator 7 then judges whether a value of sum of squares of the deviation between the calculated values and measured values of the reflection spectrum, and amount of deviation between the calculated values and measured values of the reflection spectrum are minimized, or fall within predetermined allowable ranges or not (step 5), and if they are not minimized or do not fall within predetermined allowable ranges, the set values for the height, duty ratio and periodicity of the periodic structure are adjusted (step B6), and using thus-adjusted set values, the reflection spectrum is calculated again in step B3. In other words, the calculator 7 repeats the calculation while sequentially varying the height, duty ratio and periodicity of the periodic structure, so as to minimize the sum of squares of deviation between the calculated values and measured values of the reflection spectrum, and so as to sufficiently reduce the amount of deviation between the calculated values and measured values of the reflection spectrum.

The calculator 7 outputs the height, duty ratio and periodicity of the periodic structure set for obtaining the calculated values of the reflection spectrum, if it judges that a value of sum of squares of the deviation between the calculated values and measured values of the reflection spectrum, and amount of deviation between the calculated values and measured values of the reflection spectrum fall within predetermined allowable ranges (step B7).

The above-described least square approximation can be finished within several seconds, by using values for the height, duty ratio and periodicity of the periodic structure which are initially assumed as being expectable to a certain degree in the fabrication thereof, or by using expected values predicted typically from peak positions or peak intensities of the measured wavelength dependence of intensity of the reflected light.

The process procedures shown in FIG. 7 is realized under control of a program executed by the calculator 7.

Next paragraphs will detail a method of measuring the geometry of the grating pattern formed on the InP substrate, as an example of the present invention.

Figure 9:
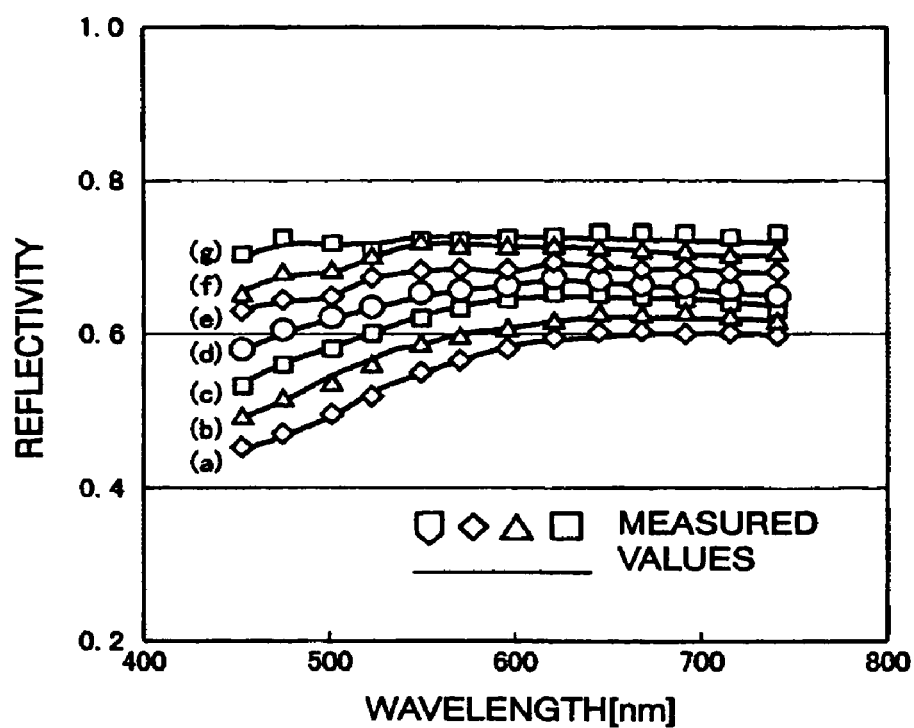
FIG. 9 is a chart showing reflection spectra of the gratings measured in Examples of the present invention, and results of parameter fitting.
Figure 10A:
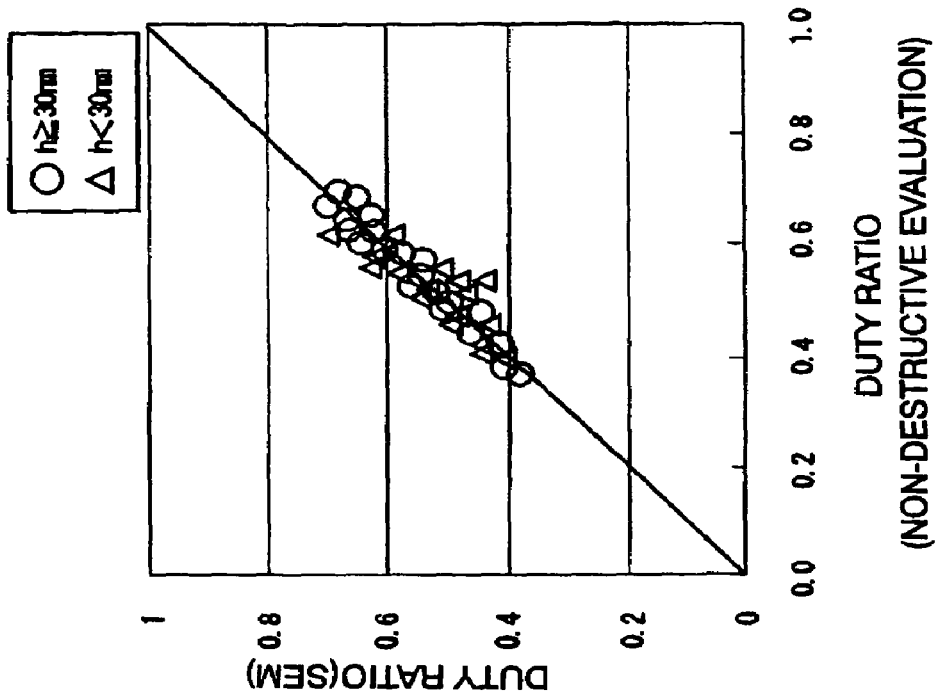
FIGS. 10A and 10B are drawings showing results of measurement of height and duty ratio, respectively, of the gratings measured in Examples of the present invention.
Figure 10B:
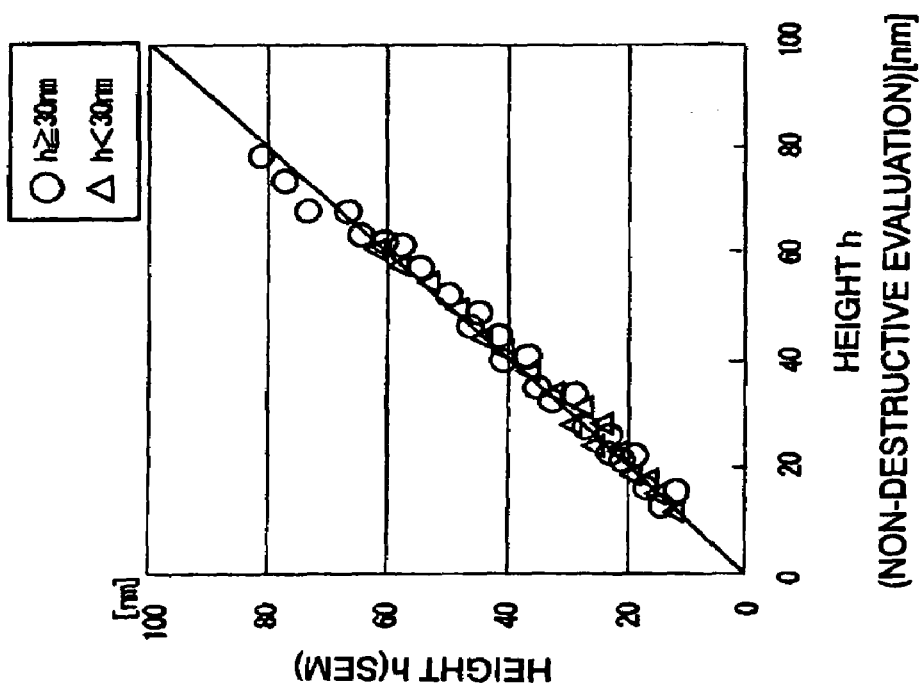

FIGS. 8A to 8G are electron microphotographs showing sectional geometry of the semiconductor grating measured in Example of the present invention. FIG. 9 is a chart showing reflection spectra of the semiconductor gratings measured in the embodiment of the present invention, and results of parameter fitting (least square approximation equation for the measured values). FIG. 10A is a drawing showing measurement results of height of the grating measured in Example of the present invention, and FIG. 10B is a drawing showing measurement results of duty ratio (ratio of the ridge to the period) of the grating measured in Example of the present invention.

FIGS. 8A to 8G are drawings showing sectional SEM photographs used for the measurement in Example of the present invention, wherein shown is a line-and-space pattern of 0.240-µm periodicity, used as a grating for a 1.55-µm-band DFB laser, fabricated by electron beam (EB) exposure.

The height and duty ratio of the grating herein are intentionally varied by varying conditions of the EB exposure and etching.

As shown in FIGS. 8A to 8G, the irregular geometries composing the grating appear as mesa forms having slopes, so that a part of the measuring beam incident thereon is predicted to cause multiple reflection, scattering or diffraction.

FIG. 9 shows wavelength dependence of intensity of the reflected light obtained by measuring the plurality of gratings which differ in the height and duty ratio as shown in FIGS. 8A to 8G, using a halogen lamp capable of emitting a non-polarized light of approximately 400 nm to 800 nm as a measuring beam source, based on spectrometric analyses of the reflected light from the samples. The measurement area was limited to as small as approximately 2 μm in diameter under an objective lens. FIG. 9 shows curves, obtained by least square fitting to the measured values using the height and duty ratio of the grating as the parameters, corresponding to the calculated results. It is to be noted that the fitting shown in the drawing was calculated under a fixed periodicity, because the periodicity of the grating is preliminarily known as 0.24 μm.

As is obvious from FIG. 9, the fitting to the measurement results are successful for any geometries which differ in the height and duty ratio of the grating.

FIG. 10A and FIG. 10B show, with respect to the height and duty ratio of the gratings, relations between measured values obtained as results of the fitting shown in FIG. 9 and measured values obtained by the SEM observation. It is found that both of the height and duty ratio of the gratings show values almost coincide with the SEM observation values.

Lowered accuracy in the measurement for a height of the grating of 30 nm or below is possibly ascribable to that only a small interference of the reflected light can be observed, and so that the spectral measurement is susceptible to noise or the like. It is therefore possible to improve accuracy in the measurement by increasing the number of times of measurement so as to reduce influences of the noise, or by raising sensitivity of the detector.

Intensity of the reflected light in the above-described Example has been measured over a wavelength range from 400 nm to 800 nm, wherein it is effective to widen the wavelength range for the measurement, because a shorter measurement wavelength often results in a clearer observation of effects of the interference, and consequently results in improvement in the measurement accuracy. It is effective to carry out the measurement of intensity of the reflected light within a wavelength range from 200 nm to 800 nm on the practical basis, because a measurement wavelength of shorter than 200 nm will fail in obtaining a satisfactory level of reflection intensity due to increased influences of the scattering, and a wavelength longer than 800 nm will result in only a limited improvement in the measurement accuracy.

The measuring beam was irradiated normally in the measurement system shown in FIG. 6, wherein almost similar analysis is made possible also when the measuring beam is irradiated from an oblique direction, and the reflected light from the surface of the substrate is measured.

The measuring beam used in the above-described Example was a non-polarized light, wherein almost similar analysis is made possible also when a polarized light source is used.

Example 2

The next paragraphs will detail a second example of the present invention.

Figure 11:
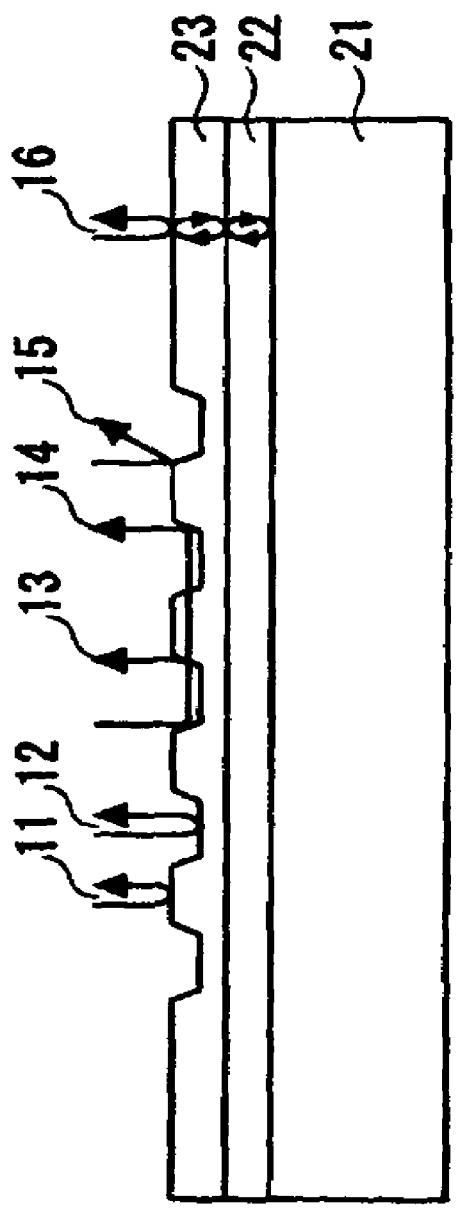
FIG. 11 is a sectional view showing a geometry of a micro-structure and reflection characteristics of a measuring beam observed in a sample measurement according to Example 2 of the method of measuring a micro-structure of the present invention.

FIG. 11 is a sectional view showing a geometry of a micro-structure and reflection characteristics under irradiation with the measuring beam in Example 2 of the method of measuring a micro-structure according to the present invention. The configuration shown in FIG. 11 differs from that of Example 1, in that semiconductor layers A 22 and B 23 are formed on a semiconductor substrate 21, and the periodic micro-structure is formed on the semiconductor layer B 23.

As the reflected light obtained upon irradiation with the measuring beam, it is necessary in this Example to take:
  reflection at the interface between the substrate and the semiconductor layer A; and
  reflection at the interface between the semiconductor layer A and semiconductor layer B;

into consideration together with the reflection on the surface of the substrate, as indicated by a reflected light 16 on the flat portion of the substrate.

Reflections 11 to 15 on the grating-forming region can also be analyzed similarly to as described in Example in the above, by taking:
  reflection at the interface between the substrate and the semiconductor layer A; and
  reflection at the interface between the semiconductor layer A and semiconductor layer B;

into consideration similarly to the case with the flat portion, although not shown.

Measurement of the micro-structure is made possible by first measuring a reflection spectrum on the flat portion, determining the layer structure, and then measuring a reflection spectrum on the grating-forming region, while taking the layer structure determined by the measurement of the flat portion into consideration.

The slope angle of the mesa in this Example differs from that shown in Example 1, and ratio of unmeasurable component of the reflected light due to scattering is unknown, so that the ratio of scattered light was first determined with respect to a standard geometry, by evaluating a reflection spectrum and sectional SEM photograph, and other samples were evaluated thereafter.

Figure 12:
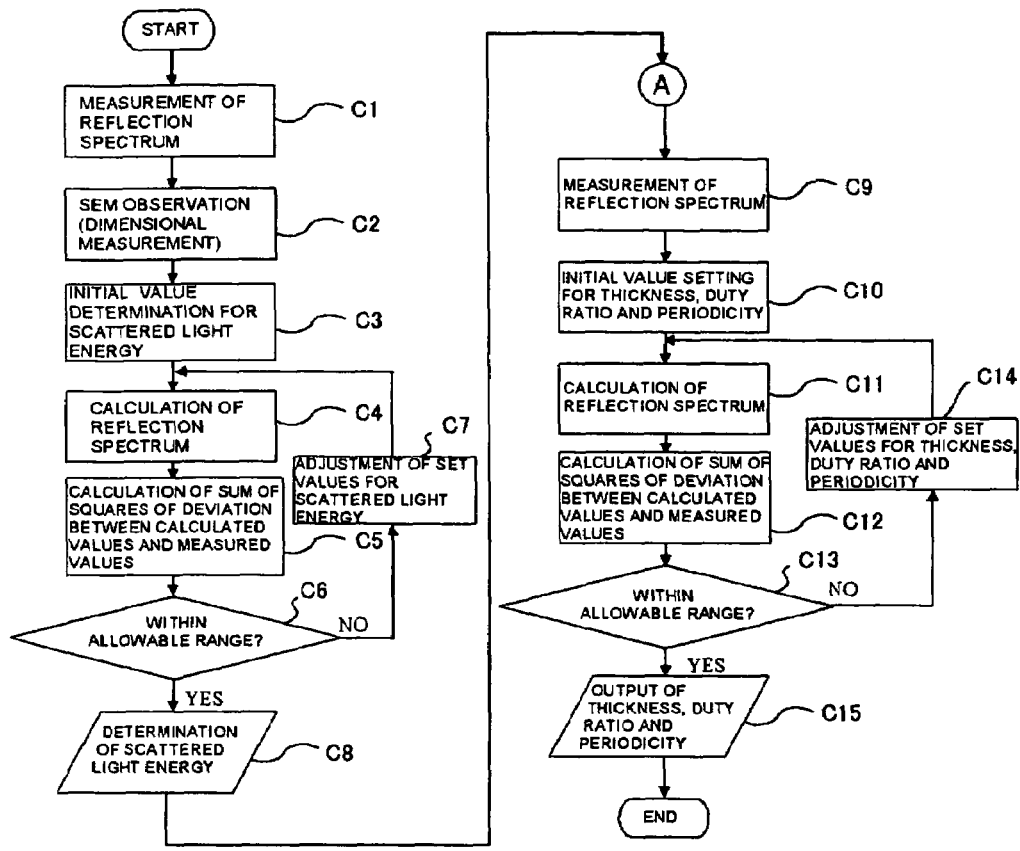
FIG. 12 is a flow chart explaining calculation procedures according to an embodiment of the method of measuring a micro-structure of the present invention.

Next paragraphs will detail one example of the calculation procedures based on the principle of the micro-structure measurement of the present invention, referring to the attached drawings. FIG. 12 is a flow chart explaining calculation procedures in Example of the method of measuring a micro-structure of the present invention.

As one technique of obtaining a ratio of the scattered light on the measurement sample, first a reflection spectrum of the measurement sample having a standard micro-structure is measured (step C1).

Next, dimension of the measurement sample is measured typically by SEM observation (step C2).

Next, the ratio of scattered light is initialized to an arbitrary value (step C3).

Next, a reflection spectrum is calculated based on thus-initialized energy of scattered light, and based on the height, duty ratio and periodicity of the periodic structure determined by the SEM observation (step C4).

Next, the calculated values of the reflection spectrum calculated in step C4 and measured values of the reflection spectrum measured in step C1 are compared, and a sum of squares of deviation between the calculated values and measured values of the reflection spectrum is calculated (step C5).

Next, whether the sum of squares of deviation between the calculated values and measured values of the reflection spectrum, and the amount of deviation between the calculated values and measured values of the reflection spectrum are minimized, or fall within predetermined allowable ranges or not is judged (step C6). If they are not minimized or do not fall within predetermined allowable ranges, the ratio of the scattered light is adjusted (step C7), and using thus-adjusted set values, the reflection spectrum is calculated again in step C4.

In other words, the calculation is repeated while sequentially varying the ratio of scattered light, so as to minimize the sum of squares of deviation between the calculated values and measured values of the reflection spectrum, and so as to sufficiently reduce the amount of deviation between the calculated values and measured values of the reflection spectrum.

If it was judged that the sum of squares of deviation between the calculated values and measured values of the reflection spectrum, and the amount of deviation between the calculated values and measured values of the reflection spectrum fell within predetermined allowable ranges, the ratio of scattered light set in order to obtain the calculated values of the reflection spectrum is adopted as a fixed value for the sample to be measured in this Example (step C8).

The above-described Example dealt with the case where only one standard sample was used for determining the ratio of scattered light, whereas use of reflection spectra and dimensions observed under the SEM obtained from a plurality of samples makes it possible to further improve the measurement accuracy. When the ratio of scattered light determined using the plurality of samples shows any dependence on the dimension of other micro-structures and so forth, it is convenient to preliminarily determine a correlation equation with respect to the ratio of scattered light.

Use of thus-determined ratio of scattered light makes it possible to analyze the height, duty ratio and periodicity of the grating based on the reflection spectrum, according to the procedures succeeding to "A" in FIG. 12, which are same as those shown in FIG. 7 (steps C9 to C14).

For the case where the geometry of the sample to be measured does not so largely vary, repetition of the calculation procedure succeeding to "A" makes it possible to evaluate the sample geometry.

Although the above-described Example dealt with the case where the ratio of scattered light is unknown, the similar method is applicable also to the case where refractive index of the sample, or dimension of a part of the sample is unknown.

The similar method is also applicable to the case where a plurality of values, such as the ratio of scattered light and refractive index of the sample, are unknown. In this case, a larger number of reference samples, for which the unknown values are determined, results in more accurate analysis.

It is also allowable to realize the process shown in FIG. 12 under control of a program executed on a computer composing the measurement apparatus.

Although the above-described Example dealt with the analytical technique for the sample shown in FIG. 11, the technique is also applicable to the sample to the measurement sample shown in FIG. 2A.

Example 3

Next paragraphs will detail Example 3 of the present invention, referring to the attached drawings.

As described in Example 1, the reflection spectrum obtained upon irradiation with the measuring beam onto the micro-structure is strongly affected by the geometry, and is reflected into the peak wavelength, intensity and so forth. Mathematical expression of the features (wavelength parameters) of the reflection spectrum therefore makes it possible to indicate dimension to be controlled.

Figure 13:
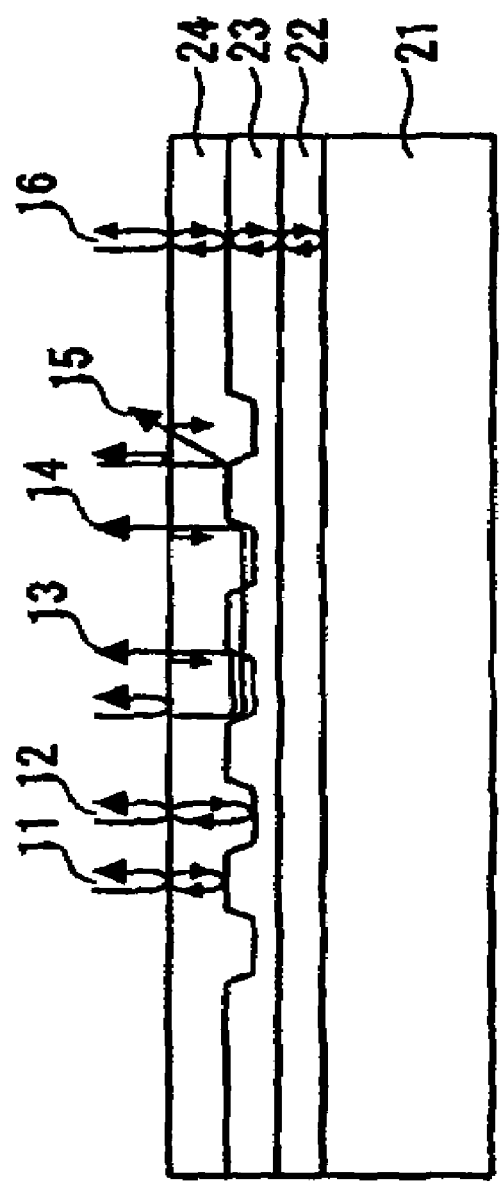
FIG. 13 is a sectional view showing a geometry of a micro-structure and reflection characteristics of a measuring beam observed in a sample measurement according to Example 3 of the method of measuring a micro-structure of the present invention.

FIG. 13 is a sectional view showing a geometry of a micro-structure and reflection characteristics of a measuring beam observed in a sample measurement according to Example 3 of the method of measuring a micro-structure of the present invention. The configuration shown in FIG. 13 differs from that of Example 2, in that the semiconductor layers A 22 and B 23 are formed on the semiconductor substrate 21, the periodic micro-structure is formed on the semiconductor layer B 23, and a semiconductor layer C 24 is formed further on the micro-structure.

In this Example, being successful in achieving a flat geometry for the sample surface, the analysis similar to as described in Example 2 is made possible by taking reflection, multiple reflection and interference at the grating-forming region into consideration, and also considering multiple-reflection and interference at the interfaces of the individual layers, although not shown.

A statistical technique for determining a correlation between the reflection spectrum and dimension of the micro-structure was adopted in this Example, because measurement simply by the method described in Example 2 resulted in only an unsatisfactory accuracy due to more complicated geometry. More specifically, in order to obtain a correlation between the reflection spectra and dimension of the micro-structure, the dimension of the micro-structure was measured by first subjecting representative geometries, which are likely to be encountered in the measurement of reflection spectra, to SEM observation and the reflection spectral measurement, and by determining a correlation equation using waveform parameters including extreme values in the reflection spectra, reflection intensities at a specific wavelength, change in the intensity between specified wavelengths and so forth.

Figure 14:
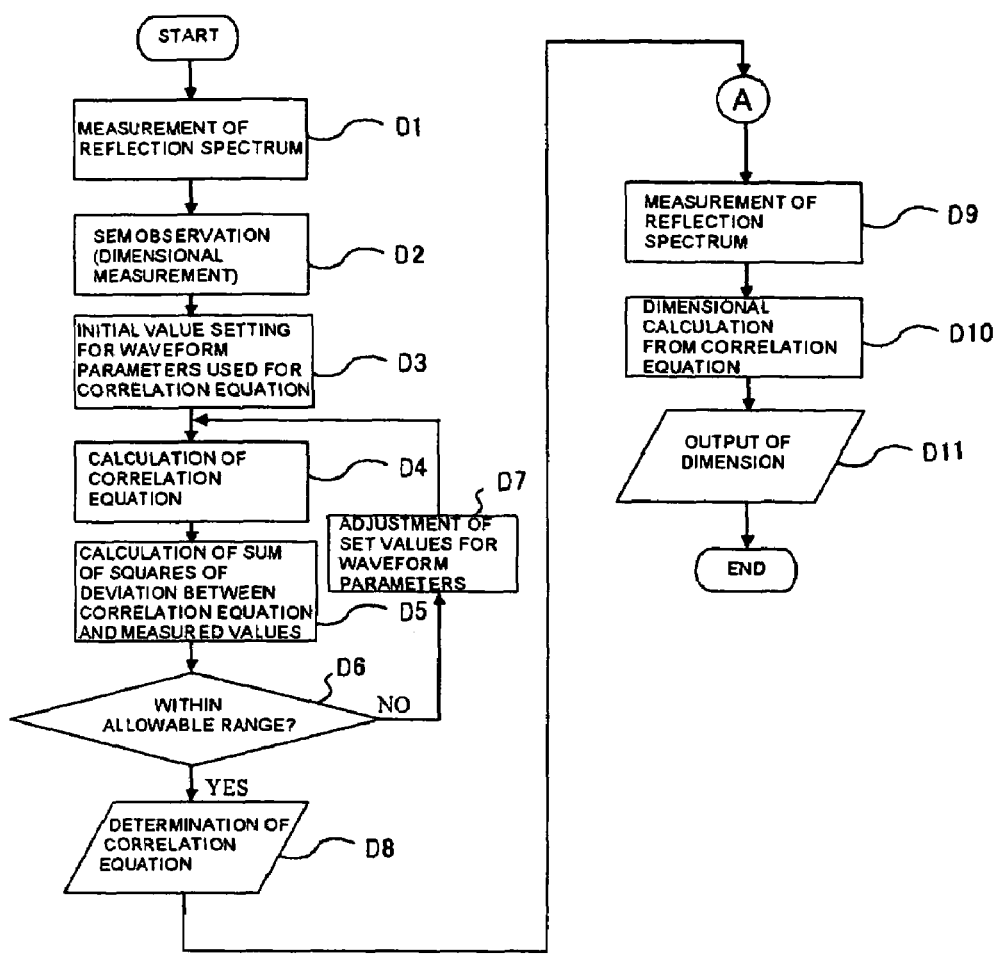
FIG. 14 is a flow chart explaining calculation procedures according to an embodiment of the method of measuring a micro-structure of the present invention.

Next paragraphs will detail the calculation procedures based on the principle of the micro-structure measurement according to the present invention. FIG. 14 is a flow chart explaining the calculation procedures in an example of the micro-structure measurement of the present invention.

First, a plurality of measurement samples, each of which having a representative geometry likely to be encountered in the measurement, are subjected to measurement of reflection spectrum (step D1). Next, dimensions in need of control of the individual samples, subjected to the reflection spectral measurement in step D1, are measured typically by SEM observation (step D2). Next, the waveform parameters used for the correlation equation are initialized to arbitrary values by a statistical technique (step D3), and a correlation equation is determined based on thus-initialized waveform parameters and the dimension in need of control measured in step D2 (step D4).

Next, the dimension obtained from the correlation equation determined in step D4 and measured values obtained from the measurement in step D2 are compared, and the sum of squares of deviation between the dimension obtained from the correlation function and the measured dimension is calculated (step D5). Whether the sum of squares of deviation between the dimension obtained from the correlation function and the measured dimension is minimized or falls within a predetermined allowable range or not is judged (step D6), the waveform parameters used for the correlation equation are varied if the value is not minimized or falls outside the predetermined allowable range (step D7), and the correlation equation is calculated again in step D4. In other words, calculation of the correlation function is repeated while sequentially varying the waveform parameters, so as to minimize the sum of squares of deviation between the dimension obtained from the correlation equation and measured dimension.

When the sum of squares of the deviation between the dimension obtained from the correlation equation and measured dimension is judged as being fallen in the predetermined allowable range, the waveform parameters and coefficients being at hand are determined as the values used for the correlation equation set for obtaining calculated values of the reflection spectrum (step D8).

In this Example, the waveform parameters of the correlation equation were determined as follows.

The waveform parameters used herein as five initial values herein include peak wavelength ($\lambda p$), peak intensity (Ip), intensity at 400 nm (I1), amount of change between intensities at 400 nm and 450 nm (D1), and amount of change between intensities at 600 nm and 650 nm.

When the dimension in need of measurement is height of the grating, the correlation equation can be expressed as follows using a1, a2, a3, a4 and a5 as constants. Assuming height of the grating determined by the correlation equation as hc, hc can be given by the formula (1) below:

$$hc = a1 \cdot \lambda p + a2 \cdot Ip + a3 \cdot I1 + a4 \cdot D1 + a5 \cdot D2 \quad (1)$$

When there are reflection spectra and SEM-observed heights (hs) of n samples preliminarily obtained, the constants a1 to a5 can be determined based on the differential equations below. Five waveform parameters used herein needs n of 5 or larger, wherein n is preferably set as large as 20 or larger in view of obtaining a certain desirable level of accuracy.

$$\Sigma(d(hc-hs)^2/d\lambda p) = 0 \quad (2)$$

$$\Sigma(d(hc-hs)^2/dIp) = 0 \quad (3)$$

$$\Sigma(d(hc-hs)^2/dI1) = 0 \quad (4)$$

$$\Sigma(d(hc-hs)^2/dD1) = 0 \quad (5)$$

$$\Sigma(d(hc-hs)^2/dD2) = 0 \quad (6)$$

For instance, the equation (2) herein expresses that a sum of $(hc-hs)^2$ for n samples differentiated by $\lambda p$ gives 0.

The height (hc) of the grating determined based on the equation (1) using thus-determined constants showed a large difference from the SEM-observed height (hs) of the grating, wherein the difference was found to correlate with $\lambda p$.

The waveform parameters were set again so as to include 8 parameters of peak wavelength ($\lambda p$), squared peak wavelength ($\lambda p^2$), peak intensity (Ip), squared peak intensity (Ip$^2$), intensity at 400 nm (I1), amount of change between intensities at 400 nm and 450 nm (D1), amount of change between intensities at 600 nm and 650 nm (D2) and product of intensity at 400 nm and amount of change between intensities at 400 nm and 450 nm (I1·D1). The correlation equation can be expressed as follows, using constants b1 to b8 similarly to as described in the above.

$$hc = b1 \cdot \lambda p + b2 \cdot \lambda p2 + b3 \cdot Ip + b4 \cdot Ip2 + b5 \cdot I1 + b6 \cdot D1 + b7 \cdot D2 + b8 \cdot I1 \cdot D1 \quad (7)$$

The correlation function can be determined by determining values of b1 to b8 by a technique similar to that described in the above. The height of the grating determined based on the equation (7) was found to show a good coincidence with the height of the grating observed under the SEM.

Use of thus-determined correlation equation makes it possible to analyze the height of the grating according to the procedures succeeding to "A" in FIG. 14 based on the reflection spectrum (steps D9 to D11). For the case where the geometry of the sample to be measured does not so largely vary, repetition of the calculation procedures succeeding to "A" makes it possible to evaluate the sample geometry.

Although the correlation equation in this Example was determined with respect to the height of the grating, it is also allowable to determine the correlation equation also with respect to duty ratio of the grating in a similar manner.

Although the height of the grating was dealt as the dimension in need of control in this Example, it is also allowable to deal the device characteristics, correlated to the height of the grating, as the value in need of control.

For example in semiconductor laser, height of the grating correlates with a coupling coefficient obtained by evaluating the device characteristic under constant refractive indices of the semiconductor layers shown in FIG. 13, and also with the oscillation threshold voltage and slope efficiency. It is therefore made possible to similarly obtain the correlation equation also by evaluating the device characteristics (step E2) as shown in FIG. 15, in place of the dimensional measurement through SEM observation.

It is also allowable to realize the processes shown in FIG. 14 and FIG. 15 under control of a program executed on a computer composing the measurement apparatus (analyzer).

Although the above-described Example handled the peak value of the reflection spectrum, reflectivity at specified wavelength and so forth as the waveform parameters, it is also allowable to approximate the obtained reflection spectrum by a polynomial, and to use the coefficients of the individual terms as the waveform parameters of the correlation equation.

For an exemplary case where intensity of the obtained reflection spectrum is expressed by a second-order function such as:

$$ax^2 + bx + c \text{ (x: wavelength, a, b, c: constants)},$$

it is allowable to use values of a, b and c as the waveform parameters.

It is still also allowable to approximate the reflection spectrum in each specified wavelength range respectively with a polynomial. For example, it is also allowable to approximate a range from 300 nm to 500 nm with Gaussian distribution, a range from 500 nm to 800 nm with a third-order function, and to use the coefficients of the individual functions.

It is to be noted that the analytical technique described in Example in the above, targeted at the measurement sample shown in FIG. 13, is applicable also to the measurement sample shown in FIG. 2A, or to the measurement sample shown in FIG. 11 in a similar manner.

Example 4

The above-described Examples 1 to 3 were successful in measuring geometry of the periodic structure which cannot readily be measured under an optical microscope or laser microscope, whereas the method is also successful in precisely estimating dimension of an isolated pattern having no periodic structure. More specifically, by fabricating an isolated pattern and a periodic structure pattern on the same sample at the same time using the same technique, and by preliminarily investigating a correlation between the both, it is made possible to estimate the geometry of the isolated pattern based on evaluation of the periodic structure pattern.

Figure 17:
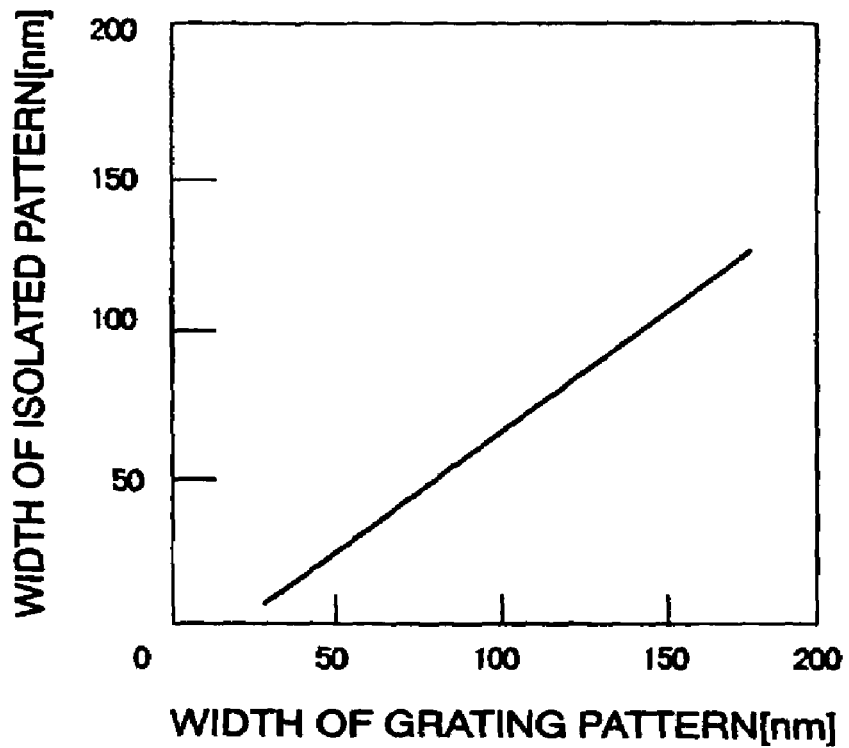
FIG. 17 is a graph showing a relation between the geometries of the isolated pattern and grating pattern in an embodiment of the present invention.

FIG. 16 shows an isolated pattern 32 and a grating pattern 33 formed on a semiconductor substrate 31 by the same process. The geometry of the isolated pattern can correctly be estimated by measuring the geometry of the grating pattern according to the present invention, based on a preliminarily-measured dimensional correlation between the grating pattern and isolated pattern shown in FIG. 17, considering a possibility of causing dimensional difference between the isolated pattern and grating pattern due to proximity effect in EB exposure, pattern effect during etching and so forth.

Figure 18:
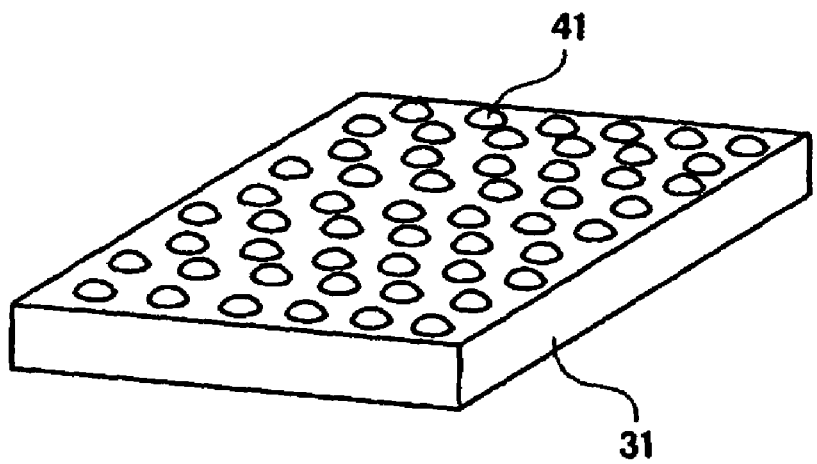
FIG. 18 is a drawing showing a geometry of a micro-structure in the method of measuring a micro-structure of the present invention.

Although the grating pattern having a unidirectional periodicity was successfully measured as the periodic structure pattern in the above-described Examples, it is also possible to measure a two-dimensional micro-structure in a similar manner. FIG. 18 is a schematic drawing of a quantum dot pattern formed on a semiconductor substrate. InAs quantum dots having a transverse dimension of 10 nm or around are formed in a self-growing manner during the crystal growth on a GaAs substrate, wherein geometry of the quantum dots can be analyzed because influence of multiple reflection ascribable to the quantum dots can be observed in the reflection spectrum. It is even possible to analyze geometry of a micro-structure having no periodicity, if the pattern density and dimension have certain levels of uniformity.

Although the above-described Examples showed analytical results of the reflection spectrum, a similar analysis is applicable also to transmission spectrum.

Example 5

Figure 19:
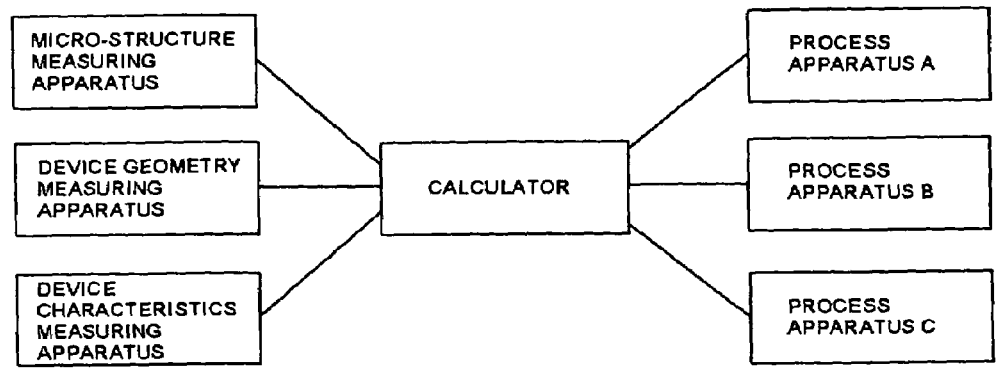
FIG. 19 is a drawing showing a state of networking of the embodiments of the micro-structure measurement apparatus of the present invention.

The above-described Examples dealt with the cases wherein the function measuring reflection spectrum of the sample and the calculator 7 analyzing the measured reflection spectrum are disposed in proximity to each other in the optical micro-structure measurement apparatus, as shown in FIG. 6, but the present invention is by no means limited to this configuration. For example, as shown in FIG. 19, the measurement can similarly be made even if the micro-structure measurement apparatus and the calculator are located remote, and connected through a network.

In this case, it is also allowable to configure a device geometry measuring apparatus, such as SEM, and a device characteristics measuring apparatus as being capable of data transmission of measured values to the calculator, and as being further capable of feeding results of the data analysis back to process conditions of other process apparatuses connected to the calculator, such as an etching apparatus, light exposure apparatus, developer and so forth. The present invention can similarly be embodied even for the case where the individual apparatuses are not connected through a network, but configured so as to transfer data via a recording medium, and so that measurement and analysis are carried out in remote places.

It is also allowable to organize a reflection spectrum analysis center dedicated to analysis of measured data, and to apply a system transmitting data between the analysis center and the production factory connected through a network.

Figure 20:
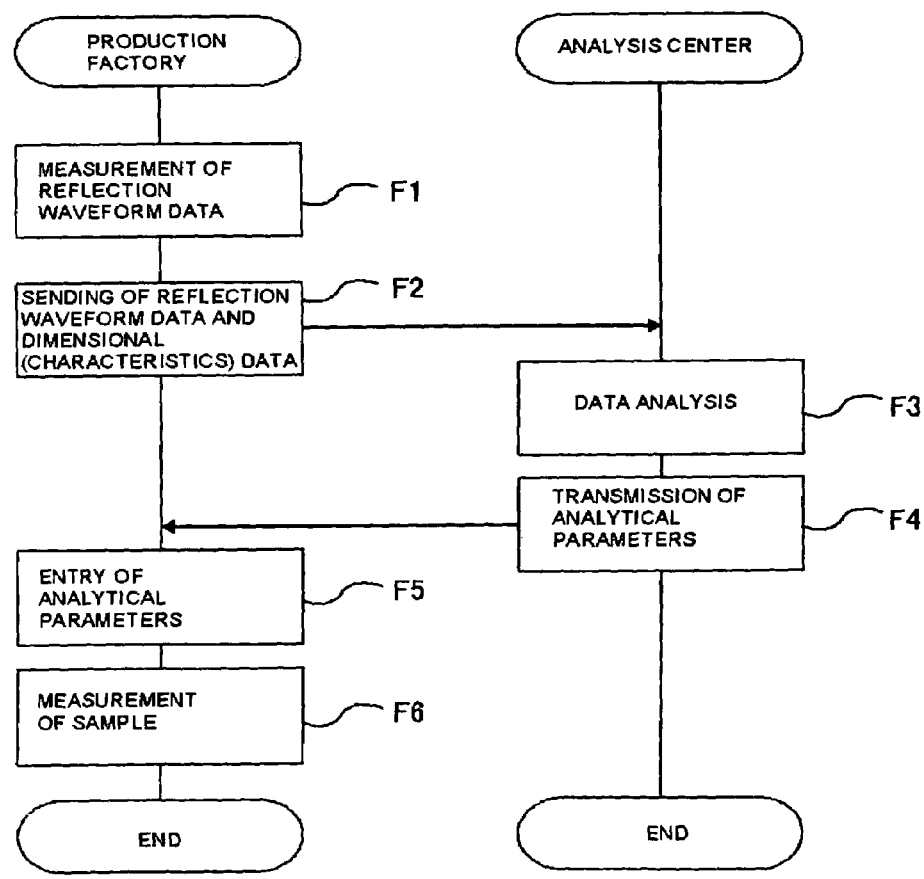
FIG. 20 is a flow chart showing operations of an embodiment of a micro-structure measurement system of the present invention.

FIG. 20 shows data transmission procedures between the production factory and reflection spectrum analysis center. At the production factory, reflection waveform data of a plurality of samples, having dimension or characteristic to be measured previously known, are measured first (step F1).

Next, the measured data are transmitted to the reflection spectrum analysis center (step F2).

Next, the data are analyzed by a reflection spectrum analysis center terminal installed at the reflection spectrum analysis center (step F3).

An analytical result is transmitted back to the production factory (step F4).

At the production factory, the correlation equation received as the analytical result is entered as an analytical parameter to the micro-structure measurement apparatus (step F5), and thereby a sample is measured (step F6).

The system of this Example is such as executing the steps D3 to D8 in FIG. 14, or steps E3 to E8 in FIG. 15, in which dimensional control of the process, or dimensional control controlling the device characteristics can be embodied simply by repeating steps D9 to D11 succeeding to "A" in FIG. 14, or steps E9 to E11 in FIG. 15, once the parameters and correlation equation are determined. The data transfer to or from the analysis center occurs only when a new sample is to be measured.

As has been described in the above, it is made possible to readily and accurately measure geometry of a micro-structure in a non-destructive manner, by irradiating a measuring beam onto the surface of the micro-structure, and by analyzing the wavelength dependence of intensity of the reflected light, considering reflection on the surfaces other than those in parallel with the measurement surface of the micro-structure, or interference ascribable to the reflection.

The above description dealt with the case where intensity of the reflected light, obtained when a measuring beam is irradiated onto the surface of the micro-structure, is used. The present invention is, however, by no means limited thereto, and it is also allowable to determine the micro-structure using intensity of transmitted light, if the transmitted light is available.

Adoption of the aforementioned micro-structure analytical system is successful in realizing more advanced and accurate data processing, and more precise geometric evaluation. This effect becomes more distinctive as the geometry of the micro-structure to be measured adds complexity.

The present invention is applicable to a method of measuring a micro-structure used for measuring a micro-structure formed by lithography, etching, crystal growth and so forth in semiconductor device fabrication processes, that is, a rough surface having a grating structure or quantum dot structure typically applied to semiconductor laser, or an irregular geometry applicable to capacitor and so forth, and is also applicable to a micro-structure measurement apparatus making use of the method.

It is apparent that the present invention is not limited to the above embodiments, that may be modified and changed without departing from the scope and spirit of the invention.

What is claimed is:

1. A method of measuring, comprising:
   measuring a measured value of a reflection spectrum of a sample having a known dimension;
   obtaining a calculated value of the reflection spectrum based on the dimension of said sample and a set initial value of a ratio of a scattered light;
   calculating a sum of squares of deviation between said measured value and said calculated value, varying said initial value of said ratio of said scattered light until the sum of squares of deviation falls within predetermined allowable range to obtain a fixed value of the ratio of said scattered light; and
   measuring a dimension of a sample having an unknown dimension from the reflection spectrum of the sample having the unknown dimension according to said fixed value.

2. The method of measuring according to claim 1, wherein both of said sample having the known dimension and said sample having the unknown dimension include a periodic structure.

3. The method of measuring according to claim 2, wherein said dimension includes a height, a duty, and a periodicity of a periodic structure.

4. A method of measuring, comprising:
   irradiating a first sample including a periodic structure with a measuring beam to measure a reflection spectrum;
   measuring the dimension of said first sample with microscope observation;
   setting a first initial value of the ratio of the scattered light;

calculating the reflection spectrum based on said first initial value and the measured dimension of said sample;

calculating a sum of squares of deviation between the calculated value of said reflection spectrum and the measured value of said reflection spectrum;

judging whether said sum of squares of deviation falls within a predetermined allowable range;

varying a set values of a ratio of said scattered light, when said sum of squares of deviation is judged as falling outside said predetermined allowable range;

adapting a ratio of scattered light set in order to obtain the calculated value of the reflection spectrum as the fixed value for the sample to be measured, when said sum of squares of deviation is judged as falling within said predetermined allowable range; and obtaining a dimension of a second sample including a periodic structure having an unknown dimension sample from the measured value of the reflection spectrum of said second sample according to said fixed value.

5. The method of measuring according to claim 4, wherein said obtaining the dimension of said second sample comprises:

measuring a reflection spectrum of said second sample;

setting a second initial value of the dimension of the second sample;

calculating the reflection spectrum based on said second initial value and said fixed value;

calculating a sum of squares of deviation between the calculated value of the reflection spectrum and the measured value of the reflection spectrum;

judging whether said sum of squares of deviation falls within the predetermined allowable range;

varying an initial value of a dimension in a geometry of said second sample, when said sum of squares of deviation is judged as falling outside said predetermined allowable range; and outputting the dimension of said second sample used for calculating said reflection spectrum, when said sum of squares of deviation is judged step as falling within said predetermined allowable range.

6. The method of measuring according to claim 5, wherein said dimension includes a height, a duty and a periodicity of the periodic structure.

* * * * *